US012694102B2

(12) United States Patent
Ideguchi et al.

(10) Patent No.: US 12,694,102 B2
(45) Date of Patent: Jul. 28, 2026

(54) IN-VEHICLE SYSTEM AND ELECTRONIC CONTROL DEVICE

(71) Applicant: Hitachi Astemo, Ltd., Hitachinaka (JP)

(72) Inventors: Kota Ideguchi, Tokyo (JP); Hirofumi Nakakoji, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 182 days.

(21) Appl. No.: 18/563,622

(22) PCT Filed: Mar. 3, 2022

(86) PCT No.: PCT/JP2022/009214
§ 371 (c)(1),
(2) Date: Nov. 22, 2023

(87) PCT Pub. No.: WO2023/286331
PCT Pub. Date: Jan. 19, 2023

(65) Prior Publication Data
US 2024/0273195 A1 Aug. 15, 2024

(30) Foreign Application Priority Data
Jul. 16, 2021 (JP) ................................. 2021-118298

(51) Int. Cl.
*G06F 21/55* (2013.01)

(52) U.S. Cl.
CPC .......... *G06F 21/554* (2013.01); *G06F 21/552* (2013.01)

(58) Field of Classification Search
None
See application file for complete search history.

(56) References Cited

U.S. PATENT DOCUMENTS

| 10,986,093 B2 * | 4/2021 | Anzai | ................... H04L 9/3242 |
| 11,985,150 B2 * | 5/2024 | Bajpai | ................ H04L 63/0435 |

(Continued)

FOREIGN PATENT DOCUMENTS

| JP | 6684690 B2 | 4/2020 |
| WO | WO 2018/070155 A1 | 4/2018 |

(Continued)

OTHER PUBLICATIONS

International Search Report (PCT/ISA/210) issued in PCT Application No. PCT/JP2022/009214 dated May 24, 2022 with English translation (4 pages).

(Continued)

*Primary Examiner* — Eleni A Shiferaw
*Assistant Examiner* — Duilio Munguia
(74) *Attorney, Agent, or Firm* — Crowell & Moring LLP

(57) ABSTRACT

When occurrence of a security event related to a security abnormality is detected, a detection device transmits a countermeasure request message including detected content of the security event to a countermeasure reader device. When the countermeasure request message is received from the detection device, the countermeasure reader device specifies countermeasure content for the security event and transmits a pre-preparation message including the detected content and the countermeasure content to other countermeasure devices. When each of the countermeasure devices excluding the countermeasure reader device receives the pre-preparation message from the countermeasure reader device, the countermeasure device verifies consistency between the detected content included in the received pre-preparation message and the countermeasure content.

8 Claims, 20 Drawing Sheets

(56) References Cited

U.S. PATENT DOCUMENTS

| | | | |
|---|---|---|---|
| 2011/0238262 A1* | 9/2011 | Fukuta | B60W 50/045 |
| | | | 701/33.4 |
| 2012/0197481 A1* | 8/2012 | Takeda | G07C 5/085 |
| | | | 701/32.7 |
| 2017/0026373 A1* | 1/2017 | Yajima | G06F 21/00 |
| 2017/0147812 A1* | 5/2017 | Ujiie | B60R 16/0231 |
| 2018/0302422 A1 | 10/2018 | Kishikawa et al. | |
| 2019/0222423 A1* | 7/2019 | Takemori | G09C 1/00 |
| 2021/0226991 A1* | 7/2021 | Takeuchi | H04L 63/1425 |

FOREIGN PATENT DOCUMENTS

| | | | | |
|---|---|---|---|---|
| WO | WO-2019216306 A1 * | 11/2019 | | H04L 12/28 |
| WO | WO 2020/008872 A1 | 1/2020 | | |

OTHER PUBLICATIONS

Japanese-language Written Opinion (PCT/ISA/237) issued in PCT Application No. PCT/JP2022/009214 dated May 24, 2022 with English translation (9 pages).

* cited by examiner

FIG. 6

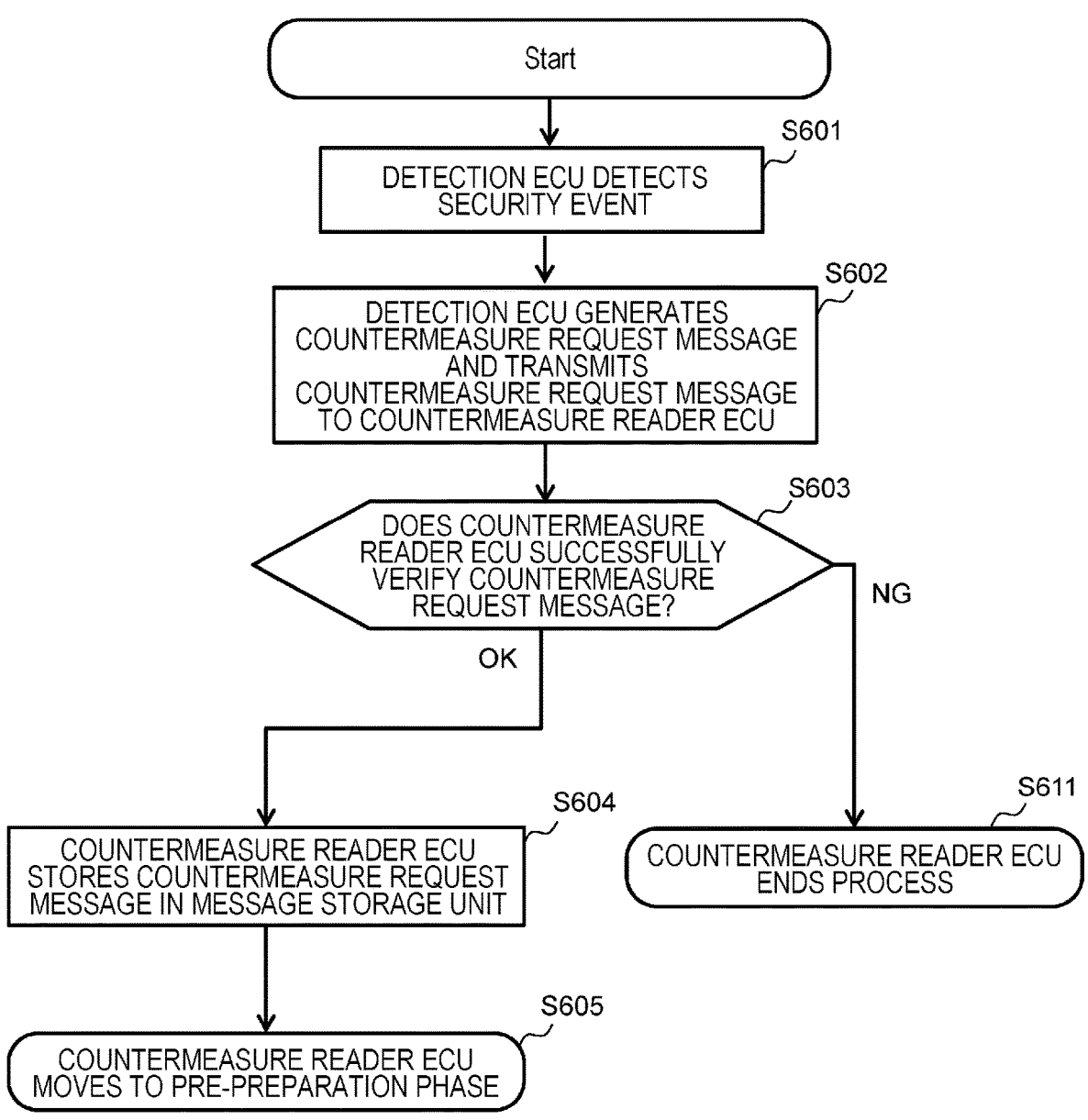

Start

S601
DETECTION ECU DETECTS
SECURITY EVENT

S602
DETECTION ECU GENERATES
COUNTERMEASURE REQUEST MESSAGE
AND TRANSMITS
COUNTERMEASURE REQUEST MESSAGE
TO COUNTERMEASURE READER ECU

S603
DOES COUNTERMEASURE
READER ECU SUCCESSFULLY
VERIFY COUNTERMEASURE
REQUEST MESSAGE?

OK

NG

S604
COUNTERMEASURE READER ECU
STORES COUNTERMEASURE REQUEST
MESSAGE IN MESSAGE STORAGE UNIT

S611
COUNTERMEASURE READER ECU
ENDS PROCESS

S605
COUNTERMEASURE READER ECU
MOVES TO PRE-PREPARATION PHASE

FIG. 19

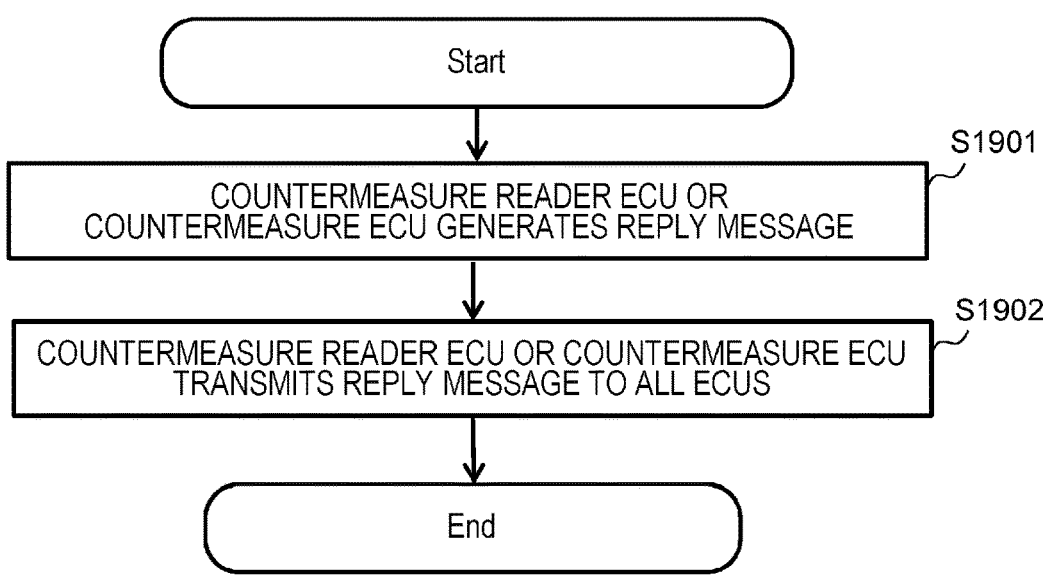

Start

S1901

COUNTERMEASURE READER ECU OR COUNTERMEASURE ECU GENERATES REPLY MESSAGE

S1902

COUNTERMEASURE READER ECU OR COUNTERMEASURE ECU TRANSMITS REPLY MESSAGE TO ALL ECUS

End

FIG. 20

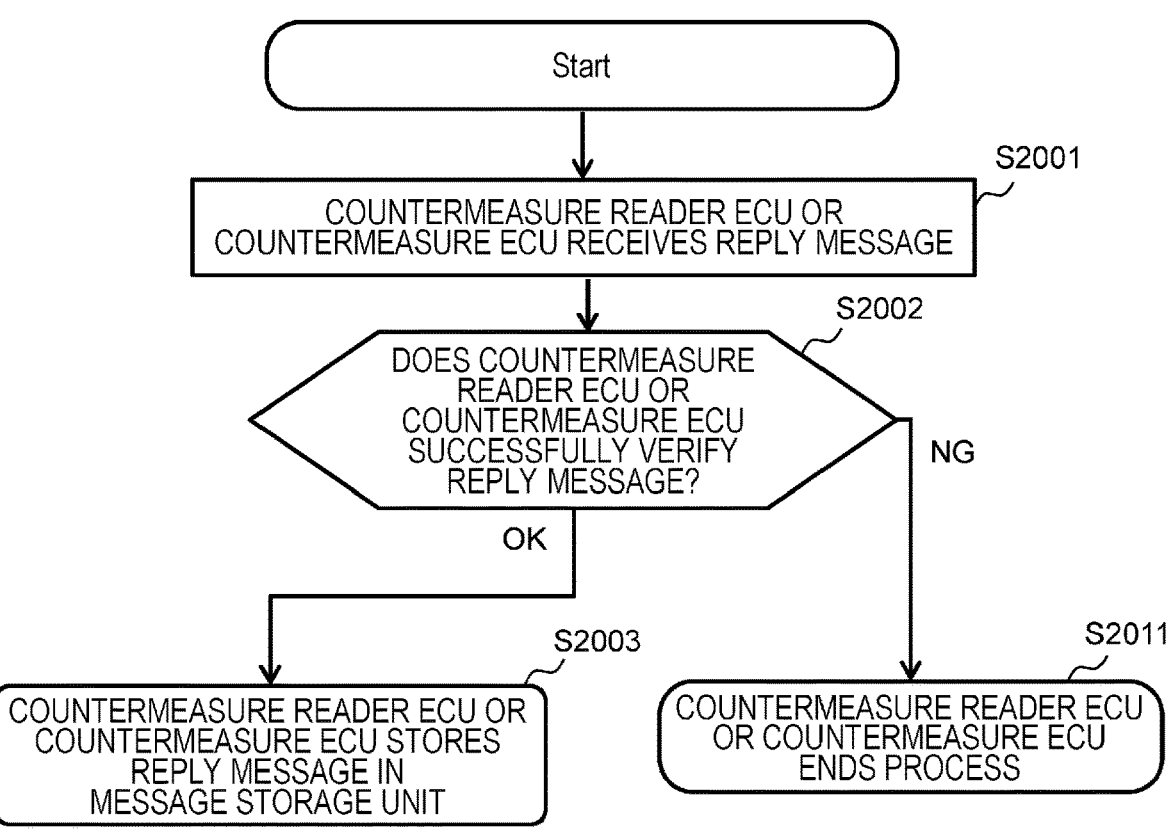

Start

S2001

COUNTERMEASURE READER ECU OR COUNTERMEASURE ECU RECEIVES REPLY MESSAGE

S2002

DOES COUNTERMEASURE READER ECU OR COUNTERMEASURE ECU SUCCESSFULLY VERIFY REPLY MESSAGE?

NG

OK

S2003

COUNTERMEASURE READER ECU OR COUNTERMEASURE ECU STORES REPLY MESSAGE IN MESSAGE STORAGE UNIT

S2011

COUNTERMEASURE READER ECU OR COUNTERMEASURE ECU ENDS PROCESS

IN-VEHICLE SYSTEM AND ELECTRONIC CONTROL DEVICE

TECHNICAL FIELD

The present invention relates to an in-vehicle system and an electronic control device mounted in a vehicle.

BACKGROUND ART

In recent years, with advancement in the Internet of Things (IoT) in which all things are connected to the Internet, guaranteeing security of IoT devices has become an important social problem. In particular, when IoT devices are automobiles such as connected cars or self-driving cars, the automobiles undergo security attacks, and thus human safety is threatened in some cases. Accordingly, techniques for minimizing such damage are required.

As countermeasure to minimize damage from cyberattacks on automobiles, it has been proposed to monitor data and a process flowing in a network of an in-vehicle system and execute countermeasures according to an abnormality when the abnormality is detected (see PTL 1).

CITATION LIST

Patent Literature

PTL 1: Japanese Patent No. 6684690

SUMMARY OF INVENTION

Technical Problem

In general, an in-vehicle system includes a plurality of electronic control units (ECUs). Each ECU exchanges information through communication and executes a process based on the exchanged information, and thus implements vehicle control. In such a situation, when the ECU itself executing a countermeasure process undergoes a cyberattack, appropriate countermeasures are not taken in the related art such as PTL 1, and the damage from the cyberattack cannot be prevented.

Solution to Problem

According to an aspect of the present invention, an in-vehicle system is mounted in a vehicle and includes a plurality of electronic control devices. Each of the plurality of electronic control devices includes at least one detection device and at least four countermeasure devices. At least one of the countermeasure devices is set as a countermeasure reader device. When occurrence of a security event related to a security abnormality is detected, the detection device transmits a countermeasure request message including detected content of the security event to the countermeasure reader device. When the countermeasure request message is received from the detection device, the countermeasure reader device specifies countermeasure content for the security event and transmits a pre-preparation message including the detected content and the countermeasure content to another countermeasure device. When the pre-preparation message is received from the countermeasure reader device, each of the countermeasure devices excluding the countermeasure reader device verifies consistency between the detected content included in the received pre-preparation message and the countermeasure content, and when it is determined that there is consistency between the detected content and the countermeasure content, each of the countermeasure devices transmits a preparation message including the countermeasure content to the other countermeasure devices. When each of the preparation messages is received from the other countermeasure devices, each of the countermeasure devices determines whether the countermeasure content included in each of the received preparation messages matches each piece of the countermeasure content included in the pre-preparation message, and when the countermeasure content matches the pre-preparation message in two or more of the preparation messages, each of the countermeasure devices transmits a commitment message including the countermeasure content to the other countermeasure devices. When the commitment messages are each received from the other countermeasure device, each of the countermeasure devices determines whether the countermeasure content included in each of the transmitted or received commitment messages matches the countermeasure content included in the pre-preparation message, and when the countermeasure content matches the pre-preparation message in three or more of the commitment messages, each of the countermeasure devices executes a security countermeasure based on the countermeasure content.

According to another aspect of the present invention, an electronic control device used for an in-vehicle system mounted in a vehicle includes: a countermeasure determination unit configured to determine countermeasure content for a security event related to a security abnormality; a message generation unit configured to generate messages to be transmitted to and received from other electronic control devices; an interface unit configured to transmit and receive the messages generated by the message generation unit to and from the other electronic control devices; and a message verification unit configured to verify the messages received by the interface unit. Based on a verification result of the messages from the message verification unit, s determined whether to execute a security countermeasure based on the countermeasure content.

Advantageous Effects of Invention

According to the present invention, it is possible to prevent damage from a cyberattack even when the ECU executing a countermeasure process in the in-vehicle system undergoes a cyberattack.

BRIEF DESCRIPTION OF DRAWINGS

FIG. 6 illustrates a flow of a process of a request phase according to the first embodiment of the present invention.

FIG. 19 illustrates a flow of a process of a first half of a reply phase according to the third embodiment of the present invention.

FIG. 20 illustrates a flow of a process of a countermeasure reader ECU or a countermeasure ECU among processes of a second half of the reply phase according to the third embodiment of the present invention.

DESCRIPTION OF EMBODIMENTS

Figure 1:
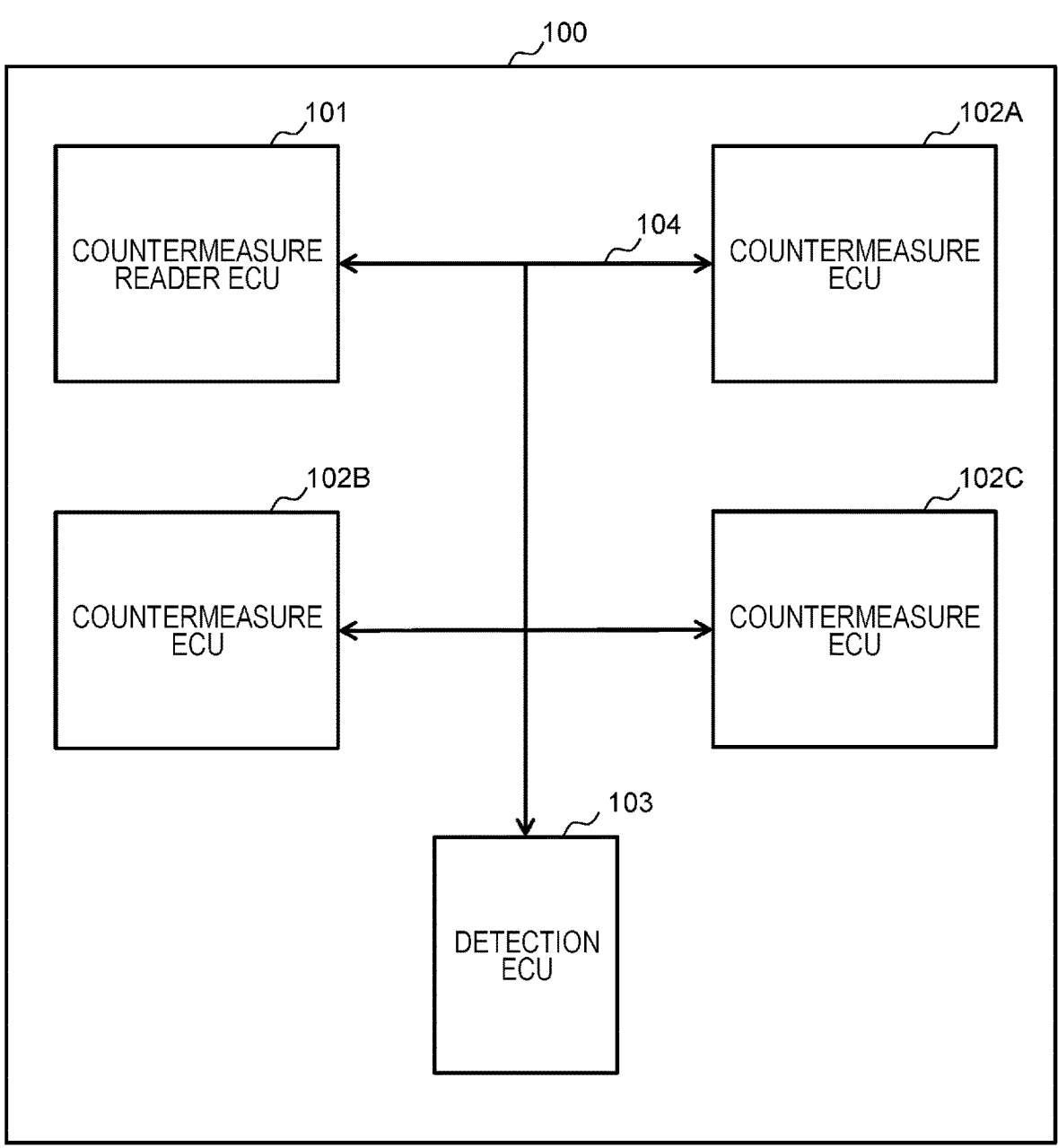
FIG. 1 illustrates a configuration of an in-vehicle system according to a first embodiment of the present invention.

In the following description, an "interface unit" may be one or more interfaces. The one or more interfaces may be one or more communication interface devices of the same type (for example, one or more network interface cards (NICs)) or two or more communication interface devices of different types (for example, an NIC and host bus adapter (HBA)).

In the following description, a "storage unit" includes at least one of a memory unit and a PDEV unit (typically, at least a memory unit). A "memory unit" is one or more memories, and may typically be a main storage device. At least one memory in the memory unit may be a volatile memory or a nonvolatile memory. A "PDEV unit" is one or more PDEVs and may typically be an auxiliary storage device. The "PDEV" is a physical storage device and is typically a nonvolatile storage device such as a hard disk drive (HDD) or a solid state drive (SSD).

In the following description, an "arithmetic unit" is one or more arithmetic modules. At least one arithmetic module is typically a microprocessor such as a central processing unit (CPU), but may be another type of arithmetic module such as a graphics processing unit (GPU). The processor serving as at least one arithmetic module may be a single core or multiple cores. At least one arithmetic module may be an arithmetic module in a broad sense such as a hardware circuit (for example, a field-programmable gate array (FPGA) or an application specific integrated circuit (ASIC) may be used) that executes some or all processes.

In the following description, information used to obtain an output with respect to an input will be described with an expression such as "xxx table", but the information may be data that has any structure or may be a learning model such as a neural network that generates an output with respect to an input. Therefore, the "xxx table" can be called "xxx information". In the following description, the configuration of each table is exemplary, and one table may be divided into two or more tables, or some or all of two or more tables may be one table.

In the following description, a function may be described with an expression such as "yyy unit" (excluding an interface unit, a storage unit, and an arithmetic unit), but the function may be implemented by causing an arithmetic unit to execute one or more computer programs, or may be implemented by one or more hardware circuits (for example, FPGAs or ASICs). When a function is implemented by causing the arithmetic unit to execute a program, a predetermined process is appropriately executed using a storage unit and/or an interface unit. Therefore, the function may be at least a part of the arithmetic unit. A process described using a function as a subject may be a process executed by an arithmetic unit or a device including the arithmetic unit. The program may be installed from a program source. The program source may be, for example, a program distribution computer or a computer-readable recording medium (for example, a non-transitory recording medium). The description of each function is exemplary, and a plurality of functions may be integrated into one function or one function may be divided into a plurality of functions.

In the following description, an "information set" is a cluster of logical electronic data viewed from a program such as an application program, and may be, for example, any of a record, a file, a key value pair, and a tuple.

In the following description, a unit of "time" may be a year, a month, a day, an hour, a minute, and a second, may be coarser or finer than those units, or may be a unit different from those units.

In the following description, when the same types of elements are described without being distinguished, common reference numerals among the reference numerals may be used. When the same kind of elements are distinguished from each other, reference numerals may be used. For example, when the countermeasure ECUs are not distinguished from each other, they are referred to as "countermeasure ECUs 102". When the countermeasure ECUs are distinguished from each other, they are referred to as a "countermeasure ECU 102A" and a "countermeasure ECU 102B".

Some embodiments of the present invention will be described below with reference to the drawings.

First Embodiment

FIG. 1 illustrates a configuration of an in-vehicle system 100 according to a first embodiment of the present invention. An in-vehicle system 100 illustrated in FIG. 1 is mounted in a vehicle to be used and includes a plurality of ECUs. Each ECU has a predetermined arithmetic processing function, and executes various arithmetic processes related to operation of a vehicle. The ECUs are connected to each other, and implement various functions in the vehicle by mutually transmitting and receiving arithmetic processing results of the ECUs.

The ECUs included in the in-vehicle system 100 include a countermeasure reader ECU 101, three countermeasure ECUs 102A, 102B, and 102C, and a detection ECU 103. The countermeasure reader ECU 101 and the countermeasure ECUs 102A to 102C each have a function of determining countermeasure content with the security event by mutual agreement and executing countermeasures against the security event with the determined countermeasure content when a security event related to a security abnormality occurs in the in-vehicle system 100. That is, since the countermeasure reader ECU 101 and the countermeasure ECUs 102A to 102C each have a function of the countermeasure ECU, the countermeasure reader ECU 101 and the countermeasure ECU 102 may be collectively referred to as "countermeasure ECUs 101 and 102" below.

The in-vehicle system 100 includes at least four countermeasure ECUs (the countermeasure reader ECU 101 and the countermeasure ECUs 102A to 102C). The countermeasure reader ECU 101 is an example of an ECU that has a main role when the countermeasure ECUs 101 and 102 agree on the countermeasure content for the security event. The plurality of countermeasure ECUs 102 (for example, the countermeasure ECUs 102A, 102B, and 102C) are examples of an ECU that has a sub-role when the countermeasure ECUs 101 and 102 agree on the countermeasure content.

In the in-vehicle system 100, for example, one of the plurality of ECUs is set as the countermeasure reader ECU 101 that has a main role, and the remaining ECUs are set as the countermeasure ECUs 102 that have sub-roles. At this time, the ECU set in the countermeasure reader ECU 101 may be fixed or may be changed at predetermined time intervals.

The detection ECU 103 is an example of an ECU that detects occurrence of a security event in the in-vehicle system 100 and requests the countermeasure ECUs 101 and 102 to execute countermeasures. A communication network 104 is provided between the ECUs, and communication between the ECUs is executed via the communication network 104.

Figure 2:
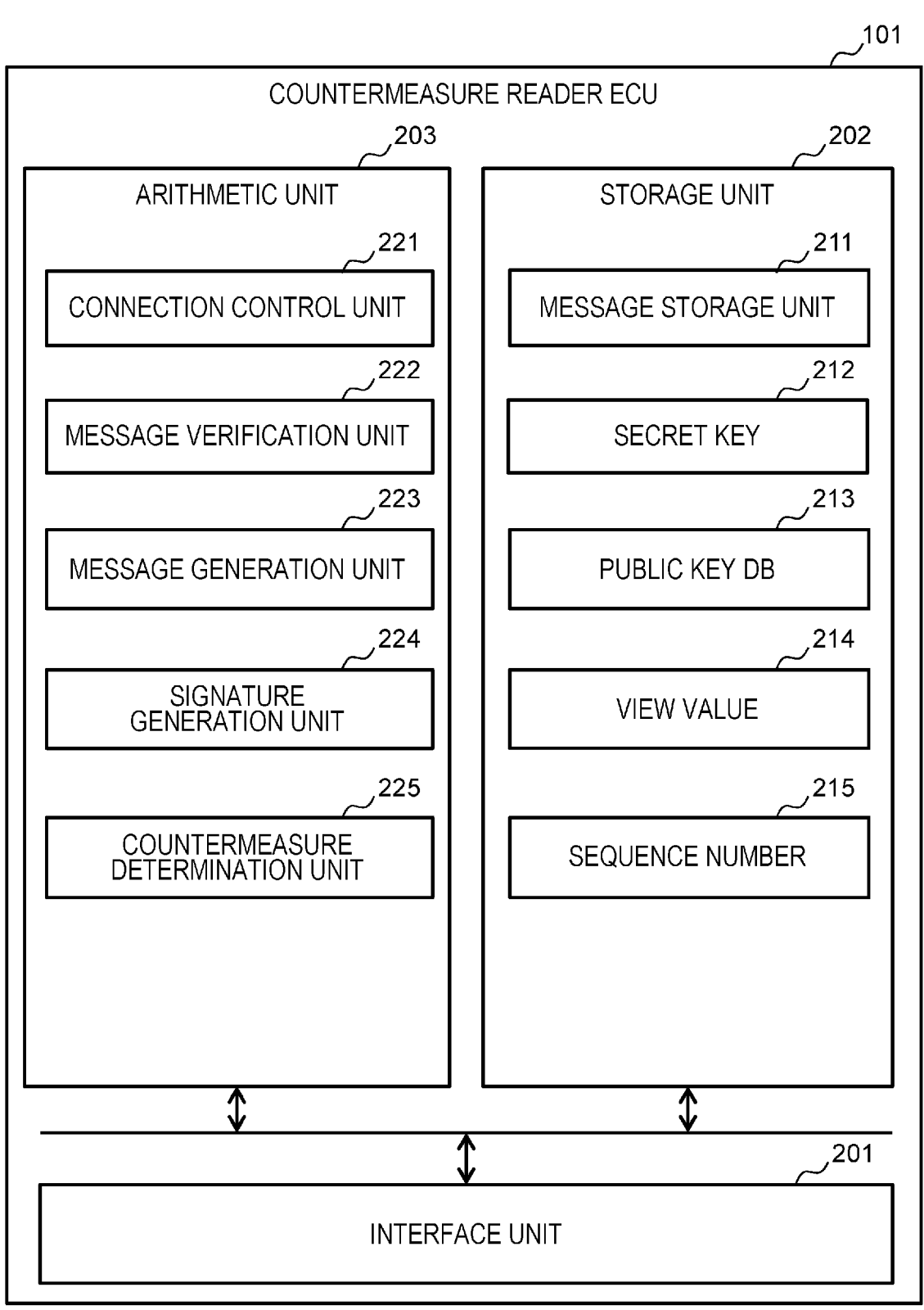
FIG. 2 illustrates a configuration of a countermeasure reader ECU according to the first embodiment of the present invention.

FIG. 2 illustrates a configuration of the countermeasure reader ECU 101.

The countermeasure reader ECU 101 is an in-vehicle computer system (one or more computers) and includes an interface unit 201, a storage unit 202, and an arithmetic unit 203. The units are connected to each other via an internal communication bus.

The interface unit 201 transmits and receives messages to and from the other ECUs. That is, the countermeasure reader ECU 101 communicates with the countermeasure ECUs 102 and the detection ECU 103 via the interface unit 201.

The storage unit 202 stores one or more computer programs executed by the arithmetic unit 203 and information referred to or updated by the arithmetic unit 203. As an example of such information, the storage unit 202 includes a message storage unit 211, a secret key 212, a public key DB 213, a view value 214, and a sequence number 215.

The message storage unit 211 stores messages received by the countermeasure reader ECU 101 from the other ECUs. The secret key 212 is a key associated with the countermeasure reader ECU 101 and is used for signature generation executed by a signature generation unit 224 to be described below. The public key DB 213 is a database that stores a public key associated with the other ECUs (the countermeasure ECUs 102 and the detection ECU 103). The view value

214 is a value used when the role of the countermeasure reader ECU 101 is sequentially shifted among the plurality of ECUs, as described above. When the countermeasure reader ECU 101 is shifted, the view value 214 is changed to a new value. The sequence number 215 is a counter that counts the number of countermeasure request messages received by the countermeasure reader ECU 101 under the current view value.

The arithmetic unit 203 implements various functions of the countermeasure reader ECU 101 by executing one or more computer programs stored in the storage unit 202. The countermeasure reader ECU 101 includes a connection control unit 221, a message verification unit 222, a message generation unit 223, a signature generation unit 224, and a countermeasure determination unit 225 as functions implemented by the arithmetic unit 203.

The connection control unit 221 controls connection with the other ECUs by controlling the interface unit 201. That is, the countermeasure reader ECU 101 can communicate with the countermeasure ECUs 102 and the detection ECU 103 via the interface unit 201 under the control of the connection control unit 221.

The message verification unit 222 verifies messages received from the other ECUs by the interface unit 201 and stored in the message storage unit 211. Details of the message verification unit 222 will be described below.

The message generation unit 223 generates messages to be transmitted to and received from the other ECUs. The message generated by the message generation unit 223 includes a pre-preparation message, a commitment message, and a reply message. Details of each message will be described below.

The signature generation unit 224 generates a signature for sign target data using the secret key 212.

When detection ECU 103 detects the occurrence of the security event, the countermeasure determination unit 225 receives the detected content as an input, and determines and outputs the countermeasure content for the security event. In the embodiment, for example, the countermeasure determination unit 225 can be implemented as a dictionary in which the detected content is used as a key and the countermeasure content is used as a value, but the present invention is not limited thereto. The countermeasure determination unit 225 can be implemented using any method as long as the countermeasure content for the security event can be determined and output according to the input detected content for the security event.

Figure 3:
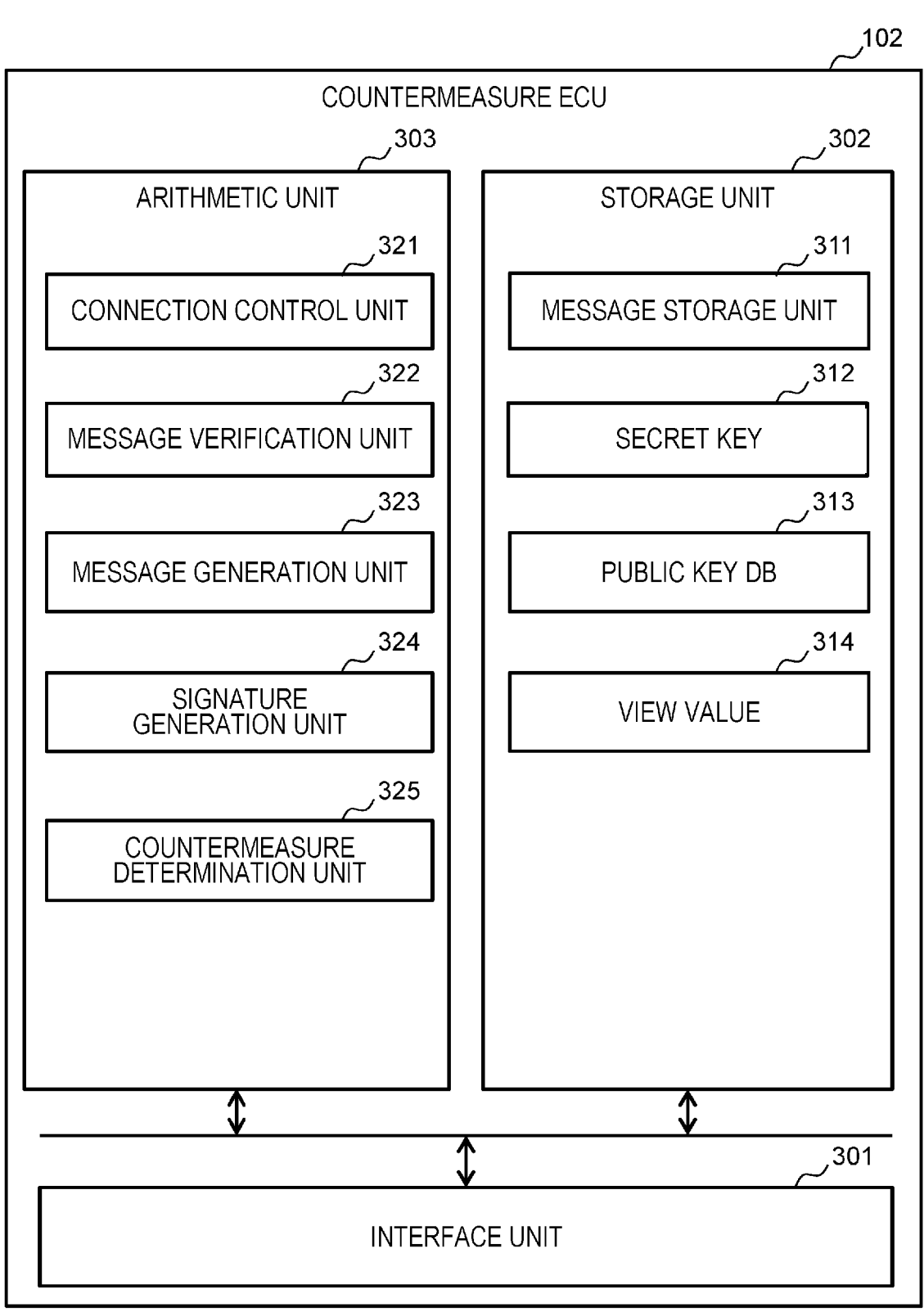
FIG. 3 illustrates a configuration of a countermeasure ECU according to the first embodiment of the present invention.

FIG. 3 illustrates a configuration of the countermeasure ECU 102. The countermeasure ECUs 102A to 102C have the same configuration.

The countermeasure ECU 102 is an in-vehicle computer system (one or more computers) and includes an interface unit 301, a storage unit 302, and an arithmetic unit 303 as in the countermeasure reader ECU 101 in FIG. 2. The units are connected to each other via an internal communication bus.

The interface unit 301 transmits and receives messages to and from the other ECUs. That is, the countermeasure ECU 102 communicates with the countermeasure reader ECU 101, the other countermeasure ECUs 102, and the detection ECU 103 via the interface unit 301.

The storage unit 302 stores one or more computer programs which are executed by the arithmetic unit 303 and information referred to or updated by the arithmetic unit 303. As an example of such information, the storage unit 302 includes a message storage unit 311, a secret key 312, a public key DB 313, and a view value 314. The units are similar to the message storage unit 211, the secret key 212, the public key DB 213, and the view value 214 stored in the storage unit 202 of the countermeasure reader ECU 101 described with reference to FIG. 2.

The arithmetic unit 303 implements various functions of the countermeasure ECU 102 by executing one or more computer programs stored in the storage unit 302. The countermeasure ECU 102 includes a connection control unit 321, a message verification unit 322, a message generation unit 323, a signature generation unit 324, and a countermeasure determination unit 325 as functions implemented by the arithmetic unit 303. These units execute processes and control similar to those of the connection control unit 221, the message verification unit 222, the message generation unit 223, the signature generation unit and 224, the countermeasure determination unit 225 implemented by the arithmetic unit 203 of the countermeasure reader ECU 101 described in FIG. 2, respectively. The message generated by the message generation unit 323 includes the commitment message, the reply message, and the preparation message described above. Details of each message will be described below.

Figure 4:
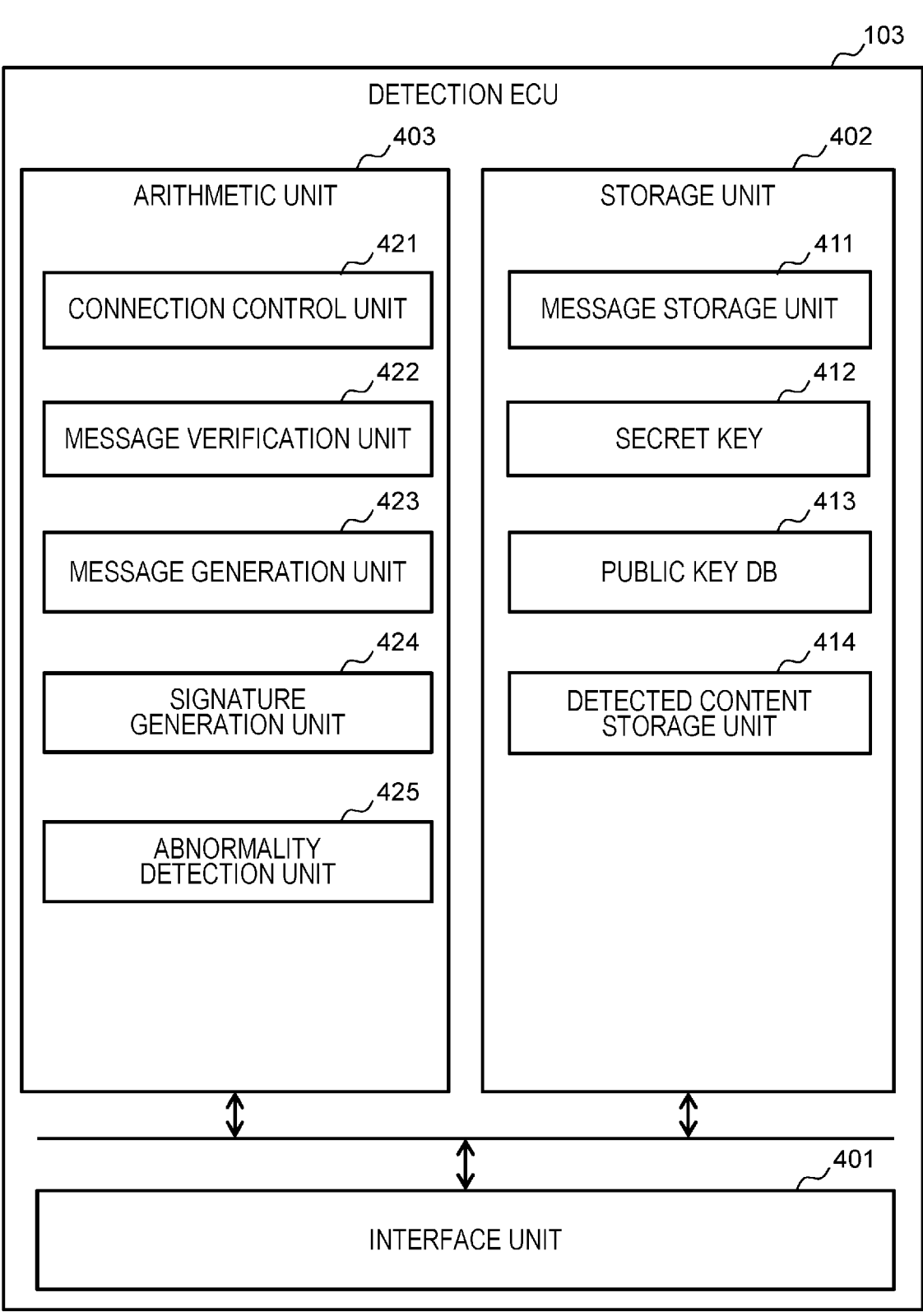
FIG. 4 illustrates a configuration of a detection ECU according to the first embodiment of the present invention.

FIG. 4 illustrates a configuration of the detection ECU 103.

The detection ECU 103 is an in-vehicle computer system (one or more computers) and includes an interface unit 401, a storage unit 402, and an arithmetic unit 403 as in the countermeasure reader ECU 101 in FIG. 2 and the countermeasure ECU 102 in FIG. 3. The units are connected to each other via an internal communication bus.

The interface unit 401 transmits and receives messages to and from the other ECUs. That is, the detection ECU 103 communicates with the countermeasure reader ECU 101 and the countermeasure ECUs 102 via the interface unit 401.

The storage unit 402 stores one or more computer programs which are executed by the arithmetic unit 403 and information referred to or updated by the arithmetic unit 403. As an example of such information, the storage unit 402 includes a message storage unit 411, a secret key 412, a public key DB 413, and a detected content storage unit 414. The message storage unit 411, the secret key 412, and the public key DB 413 are respectively similar to the message storage unit 211, the secret key 212, and the public key DB 213 stored in the storage unit 202 of the countermeasure reader ECU 101 described in FIG. 2. The detected content storage unit 414 stores information indicating a security abnormality detected by the abnormality detection unit 425 to be described below.

The arithmetic unit 403 implements various functions of the detection ECU 103 by executing one or more computer programs stored in storage unit 402. The detection ECU 103 includes a connection control unit 421, a message verification unit 422, a message generation unit 423, a signature generation unit 424, and an abnormality detection unit 425 as functions implemented by the arithmetic unit 403. The connection control unit 421, the message verification unit 422, the message generation unit 423, and the signature generation unit 424 execute processes and control similar to those of the connection control unit 221, the message verification unit 222, the message generation unit 223, and the signature generation unit 224 implemented by the arithmetic unit 203 of the countermeasure reader ECU 101 described in FIG. 2, respectively. The message generated by the message generation unit 423 includes a countermeasure request message. Details of the countermeasure request message will be described below.

The abnormality detection unit 425 detects a security abnormality occurring in the in-vehicle system 100 as a security event. In the embodiment, for example, the abnormality detection unit 425 can monitor data flowing in the communication network 104 of the in-vehicle system 100, determine that a security abnormality has occurred when data satisfies a certain specific rule, and detect the occurrence of the security abnormality as the occurrence of a security event, but the present invention is not limited thereto. When a security abnormality occurs in the in-vehicle system 100, the abnormality detection unit 425 can be implemented using any method as long as the abnormality can be appropriately detected.

Here, details of messages transmitted and received between the ECUs will be described. When a security abnormality occurs in the in-vehicle system 100, the detection ECU 103 causes the abnormality detection unit 425 to detect the security abnormality, and causes the message generation unit 423 to generate a countermeasure request message m. The countermeasure request message m is expressed in, for example, a message syntax as expressed in the following Formula (1).

$$m = <REQUEST, o, t, c>_{oj} \tag{1}$$

In Formula (1), the countermeasure request message m includes a countermeasure request message body in which a character string "REQUEST" indicating a countermeasure request message, detected content o indicating content of the security event detected by the abnormality detection unit 425, a time stamp t indicating a time at which the abnormality detection unit 425 has detected the security event, and an identifier c for identifying the detection ECU 103 are described, and a signature value oj generated by the signature generation unit 424 for the countermeasure request message body.

In the detection ECU 103, the countermeasure request message m generated by the message generation unit 423 is transmitted from the interface unit 401 to the countermeasure reader ECU 101 under the control of the connection control unit 421. When this countermeasure request message m is received, the countermeasure reader ECU 101 verifies the countermeasure request message m by the message verification unit 222, and the verification is successful, the message generation unit 223 generates a pre-preparation message. The pre-preparation message is expressed in, for example, a message syntax as expressed in the following Formula (2).

$$Pre\text{-preparation message} = <PRE\text{-}PREPARE, v, n, q, d>_{op}, m> \tag{2}$$

In Formula (2), the pre-preparation message includes a pre-preparation message body in which a character string "PRE-PREPARE" indicating a pre-preparation message, a view value v indicating a current view value 214 maintained in the storage unit 202 by the countermeasure reader ECU 101, a sequence number n indicating a latest sequence number 215 in the view value v, countermeasure content q indicating countermeasure content determined by the countermeasure determination unit 225 with respect to detected content o included in the countermeasure request message m, and a hash value d indicating a hash value of the countermeasure request message m are described, a signature value op generated by the signature generation unit 224 for the pre-preparation message body, and the received countermeasure request message m.

In the countermeasure reader ECU 101, the pre-preparation message generated by the message generation unit 223 is transmitted from the interface unit 201 to each of the countermeasure ECUs 102 (the countermeasure ECUs 102A to 102C) under the control of the connection control unit 221. When this pre-preparation message is received, the message verification unit 322 in each countermeasure ECU 102 verifies the pre-preparation message. When the verification is successful, the message generation unit 323 generates a preparation message. This preparation message is expressed in, for example, a message syntax as expressed in the following Formula (3).

$$\text{Preparation message} = <\text{PREPARE}, v, n, q, d, i>_{oi} \quad (3)$$

In Formula (3), the preparation message includes a preparation message body in which a character string "PREPARE" indicating a preparation message, a view value v, a sequence number n, countermeasure content q, and a hash value d included in the received pre-preparation message, and an identifier i for identifying the countermeasure ECU 102 are described, and a signature value oi generated by the signature generation unit 324 for the preparation message body.

In each of the countermeasure ECUs 102, the preparation message generated by the message generation unit 323 is transmitted from the interface unit 301 to each of the other countermeasure ECUs 101 and 102 (the ECUs other than the own ECU among the countermeasure reader ECU 101 and the countermeasure ECUs 102A to 102C) under the control of the connection control unit 321. When the preparation message is received, each of the message verification units 222 and 322 of the countermeasure ECUs 101 and 102 verifies the preparation message. When the verification is successful, each of the message generation units 223 and 323 of each countermeasure ECU generates a commitment message. This commitment message is expressed in, for example, a message syntax as shown in the following Formula (4).

$$\text{Commitment message} = <\text{COMMIT}, v, n, q, d, i>_{oi} \quad (4)$$

In Formula (4), the commitment message includes a commitment message body in which a character string "COMMIT" indicating a commitment message, a view value v, a sequence number n, countermeasure content q, and a hash value d included in the received preparation message, and an identifier i for identifying the countermeasure ECU are described, and a signature value oi generated by each the signature generation units 224 and 324 for the commitment message body.

In each of the countermeasure ECUs 101 and 102, the commitment message generated by each of the message generation units 223 and 323 is transmitted from each of the interface units 201 and 301 to each of the other countermeasure ECUs (each ECU other than the own ECU among the countermeasure reader ECU 101 and the countermeasure ECUs 102A to 102C) under the control of each of the connection control units 221 and 321. When the commitment message is received, each of the countermeasure ECUs 101 and 102 verifies the commitment message by each of the message verification units 222 and 322. When the verification is successful, each of the message generation units 223 and 323 of each countermeasure ECU generates a reply message after a countermeasure is executed based on the countermeasure content q included in the commitment message. This reply message is expressed in, for example, a message syntax as expressed in the following Formula (5).

$$\text{Reply message} = <\text{REPLY}, v, t, c, i, q, r>_{oi} \quad (5)$$

In Formula (5), the reply message includes a reply message body in which a character string "REPLY" indicating a reply message, a view value v included in the received commitment message, a time stamp t and an identifier c of the detection ECU 103 included in the countermeasure request message m in the received commitment message, an identifier i for identifying the countermeasure ECU, an executed countermeasure content q, and an execution result r are described, and a signature value oi generated by each of the signature generation units 224 and 324 for the reply message body.

In each of the countermeasure ECUs 101 and 102, the reply message generated by each of the message generation units 223 and 323 is transmitted from each of the interface units 201 and 301 to the detection ECU 103 under the control of each of the connection control units 221 and 321.

Figure 5:
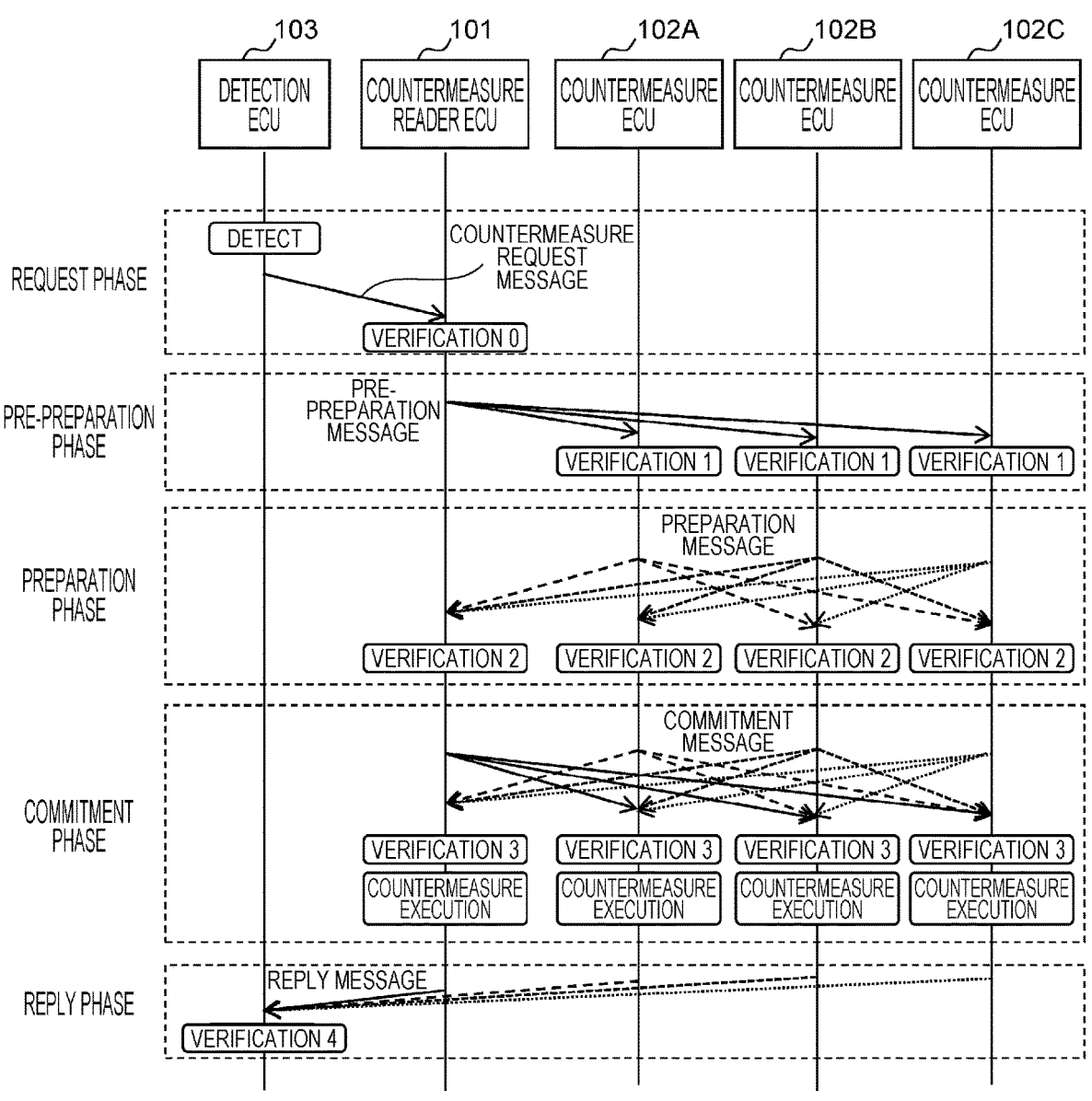
FIG. 5 illustrates an outline of a sequence of communication and a process according to the first embodiment of the present invention.

FIG. 5 illustrates an outline sequence of communication and a process among the countermeasure reader ECU 101, the countermeasure ECUs 102A to 102C, and the detection ECU 103 according to the embodiment. As illustrated in FIG. 5, the process in the embodiment includes five phases, that is, a request phase, a pre-preparation phase, a preparation phase, a commitment phase, and a reply phase.

First, when the detection ECU 103 detects a security event in the request phase, a countermeasure request message is issued and transmitted to the countermeasure reader ECU 101. When the countermeasure request message is received, the countermeasure reader ECU 101 verifies the received countermeasure request message.

When the verification of the countermeasure request message is successful, the countermeasure reader ECU 101 issues a pre-preparation message and transmits the pre-preparation message to the countermeasure ECUs 102A to 102C in the pre-preparation phase. When the pre-preparation message is received, the countermeasure ECUs 102A to 102C each verify the received pre-preparation message.

Then, when the verification of the pre-preparation message is successful, the countermeasure ECUs 102A to 102C each issue a preparation message and transmit the preparation message to the countermeasure reader ECU 101 and the other countermeasure ECUs 102 in the preparation phase. When the preparation message is received, the countermeasure reader ECU 101 and the countermeasure ECUs 102A to 102C each verify the received preparation message.

Further, when the verification of the preparation message is successful, the countermeasure reader ECU 101 and the countermeasure ECUs 102A to 102C each issue a commitment message and transmit the commitment message to the other countermeasure ECUs 101 and 102 in the commitment phase. When the commitment message is received, the countermeasure reader ECU 101 and the countermeasure ECUs 102A to 102C each verify the received commitment message and execute the agreed countermeasure.

Finally, the countermeasure reader ECU 101 and the countermeasure ECUs 102A to 102C each issue a reply message in the reply phase and transmit the reply message to the detection ECU 103. When the reply message is received, the detection ECU 103 verifies the received reply message, and terminates the countermeasure request against the security event.

Next, details of a process of each ECU in each of the foregoing phases will be described.

FIG. 6 illustrates a flow of a process of the request phase according to the embodiment. When the abnormality detection unit 425 of the detection ECU 103 detects a security event (S601), the message generation unit 423 generates a countermeasure request message with the message syntax shown in the above Formula (1). Then, the connection control unit 421 transmits the generated countermeasure request message to the countermeasure reader ECU 101 using the interface unit 401 (S602).

When the countermeasure reader ECU 101 receives the countermeasure request message, the message verification unit 222 verifies the received countermeasure request message (S603). Here, the verification of the countermeasure request message executed by the message verification unit 222 includes, for example, the following verification processes.

(Verification 0) Validity of a combination of a body and a signature of the countermeasure request message is verified using the public key of detection ECU 103 stored in public key DB 213.

When the verification of the countermeasure request message is successful (OK in S603), the countermeasure reader ECU 101 stores the countermeasure request message in the message storage unit 211 (S604) and moves the process to the pre-preparation phase (S605). When the verification of the countermeasure request message fails (NG in S603), the countermeasure reader ECU 101 discards the countermeasure request message and ends the process (S611).

Figure 7:
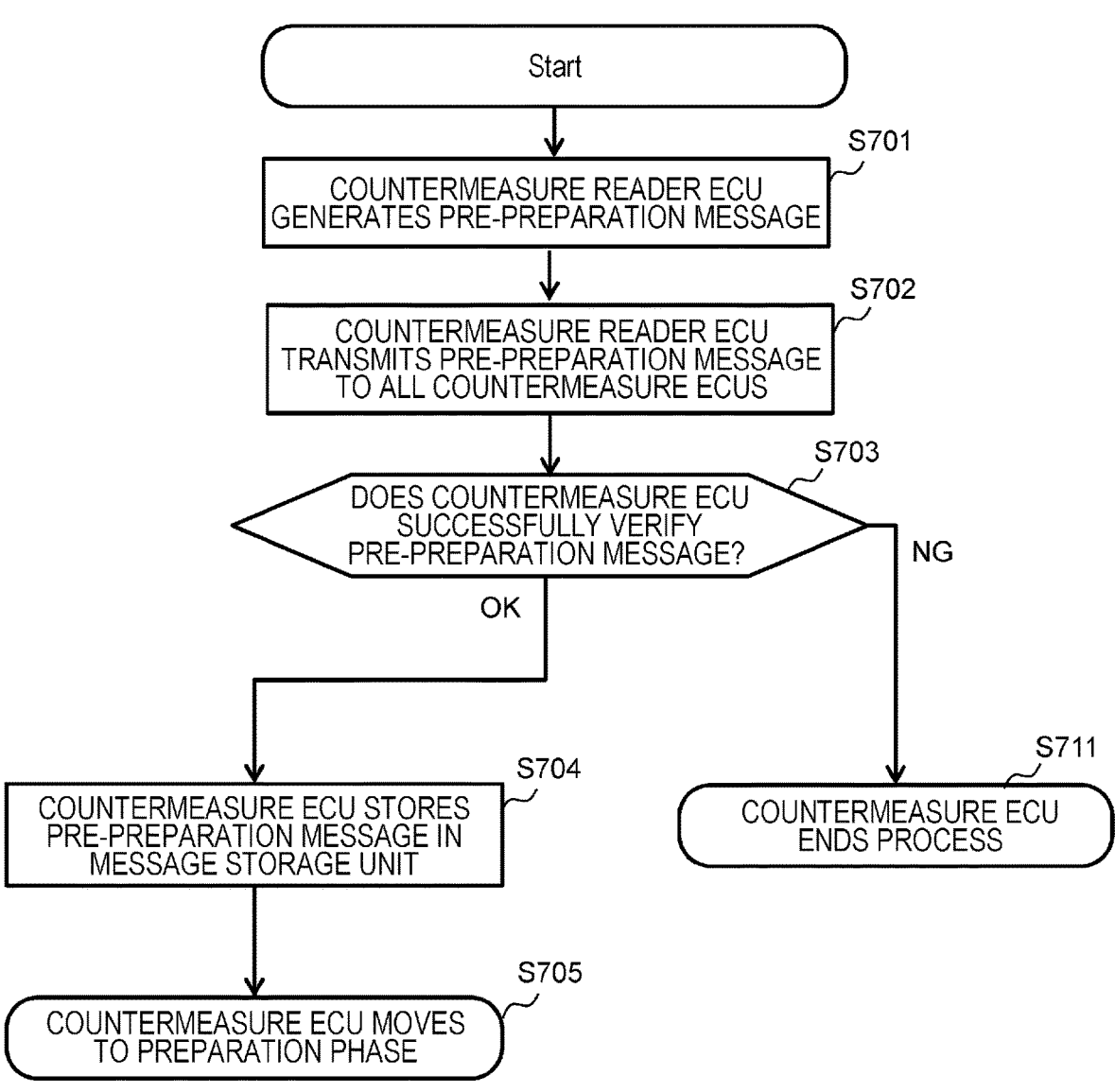
FIG. 7 illustrates a flow of a process of a pre-preparation phase according to the first embodiment of the present invention.

FIG. 7 illustrates a flow of a process of the pre-preparation phase according to the embodiment. In the countermeasure reader ECU 101, the message generation unit 223 determines the countermeasure content q for the detected content o included in the countermeasure request message by using the countermeasure determination unit 225 based on the countermeasure request message stored in the message storage unit 211, and generates the pre-preparation message with the message syntax shown in the above Formula (2) (S701). The pre-preparation message generated here is stored in the message storage unit 211. Then, the connection control unit 221 transmits the generated pre-preparation message to all the countermeasure ECUs 102 (the countermeasure ECUs 102A to 102C) using the interface unit 201 (S702).

In each of the countermeasure ECU 102 receiving the pre-preparation message, the message verification unit 322 verifies the pre-preparation message (S703). Here, the verification of the pre-preparation message executed by the message verification unit 322 includes, for example, at least one of the following verification processes.

(Verification 1-1) Validity of a combination of a body and a signature of the pre-preparation message is verified using a public key of the countermeasure reader ECU 101 stored in the public key DB 313.

(Verification 1-2) Validity of a combination of a body and a signature of the countermeasure request message m included in the pre-preparation message is verified using a public key of the detection ECU 103 stored in the public key DB 313.

(Verification 1-3) It is verified that the view value v included in the pre-preparation message matches the view value 314 maintained in the storage unit 302.

(Verification 1-4) It is verified that another pre-preparation message having the same view value v and sequence number n as those of a verification target pre-preparation message and having a different hash value d is not stored in the message storage unit 311.

(Verification 1-5) Consistency between the detected content o and the countermeasure content q described in the countermeasure request message m included in the pre-preparation message is verified. Specifically, the countermeasure determination unit 325 receives the detected content o and verifies that the countermeasure content output from the countermeasure determination unit 325 with respect to the detected content o matches the countermeasure content q included in the pre-preparation message.

When the verification of the pre-preparation message is successful (OK in S703), each countermeasure ECU 102 stores the pre-preparation message in the message storage unit 311 (S704) and moves the process to the preparation phase (S705). When the verification of the pre-preparation message fails (NG in S703), each countermeasure ECU 102 discards the pre-preparation message and ends the process (S711).

Figure 8:
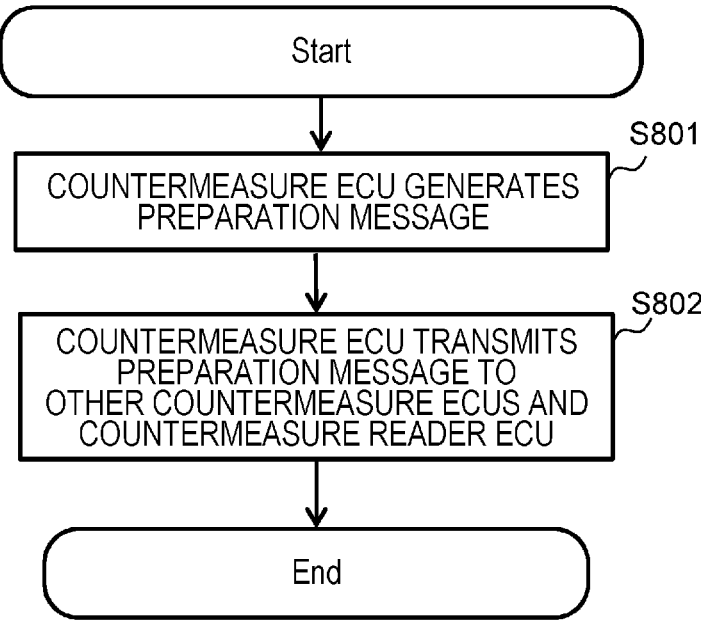
FIG. 8 illustrates a flow of a process in a first half of a preparation phase according to the first embodiment of the present invention.

FIG. 8 illustrates a flow of a process in the first half of the preparation phase according to the embodiment. In each countermeasure ECU 102, the message generation unit 323 generates a preparation message with the message syntax shown in the above-described Formula (3) based on the pre-preparation message stored in the message storage unit 311 (S801). The preparation message generated here is stored in the message storage unit 311. Then, the connection control unit 321 transmits the generated preparation message to all the other countermeasure ECUs 102 and the countermeasure reader ECU 101 using the interface unit 301 (S802).

Figure 9:
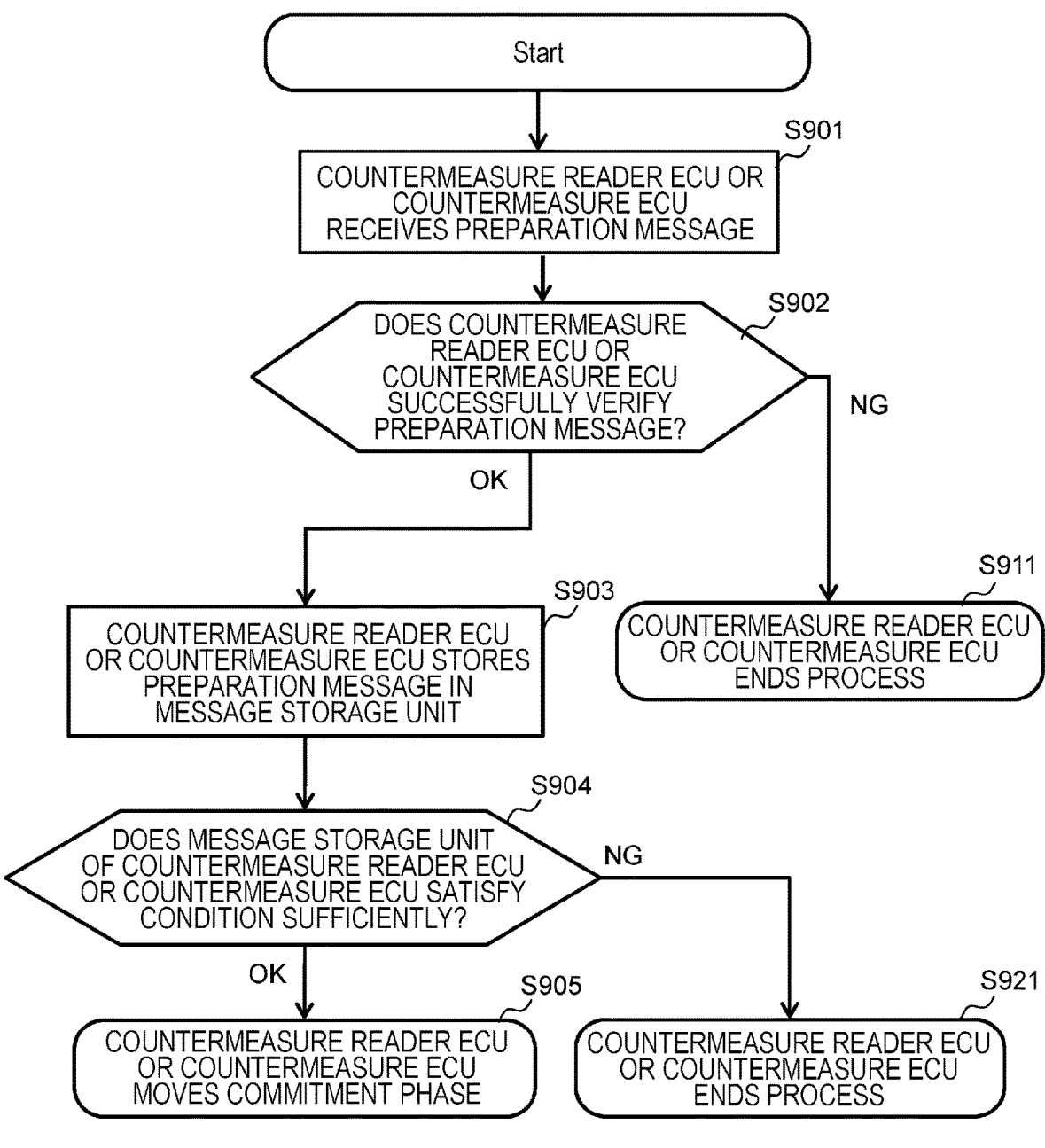
FIG. 9 illustrates a flow of a process in the second half of the preparation phase according to the first embodiment of the present invention.

FIG. 9 illustrates a flow of a process in the second half of the preparation phase according to the embodiment. When the countermeasure reader ECU 101 or each countermeasure ECU 102 receives the preparation message transmitted from another countermeasure ECU 102 (S901), the message verification unit 222 and 322 verify the preparation message (S902). Here, the verification of the preparation messages executed by the message verification unit 222 and 322 includes, for example, at least one of the following verification processes.

(Verification 2-1) Validity of a combination of a body and a signature of the preparation message is verified using the public key of the countermeasure ECU 102 of a transmission source of the preparation message stored in the public key DBs 213 and 313.

(Verification 2-2) It is verified that the view value v included in the preparation message matches the view values 214 and 314 maintained in the own storage units 202 and 302.

(Verification 2-3) It is verified that the sequence number n included in the preparation message falls within a preset acceptable value range.

When the verification of the preparation message fails (NG in S902), the countermeasure reader ECU 101 or each countermeasure ECU 102 discards the preparation message and ends the process (S911). When the verification of the preparation message is successful (OK in S902), the countermeasure reader ECU 101 or each countermeasure ECU 102 stores the preparation message in the message storage units 211 and 311 (S903). Then, the message verification units 222 and 322 verify sufficiency of a preparation message set stored in the own message storage units 211 and 311 (S904). Here, the verification of the sufficiency of the preparation message set executed by the message verification units 222 and 322 includes, for example, at least one of the following verification processes.

(Verification 2-4) It is verified that a pre-preparation message including the countermeasure request message m giving a hash value of the same value as the hash value d included in the preparation message is stored in the message storage units 211 and 311.

(Verification 2-5) It is verified that two or more preparation messages including the same view value v, sequence number n, countermeasure content q, and hash value d as the pre-preparation messages transmitted from the other countermeasure ECUs 102 and stored in the message storage units 211 and 311 are stored in the message storage units 211 and 311.

When the verification of the sufficiency of the preparation message set is successful (OK in S904), the countermeasure reader ECU 101 or each countermeasure ECU 102 moves the process to the commitment phase (S905). When the verification of the sufficiency of the preparation message set fails (NG in S904), the countermeasure reader ECU 101 or each countermeasure ECU 102 discards the preparation message and ends the process (S921).

Figure 10:
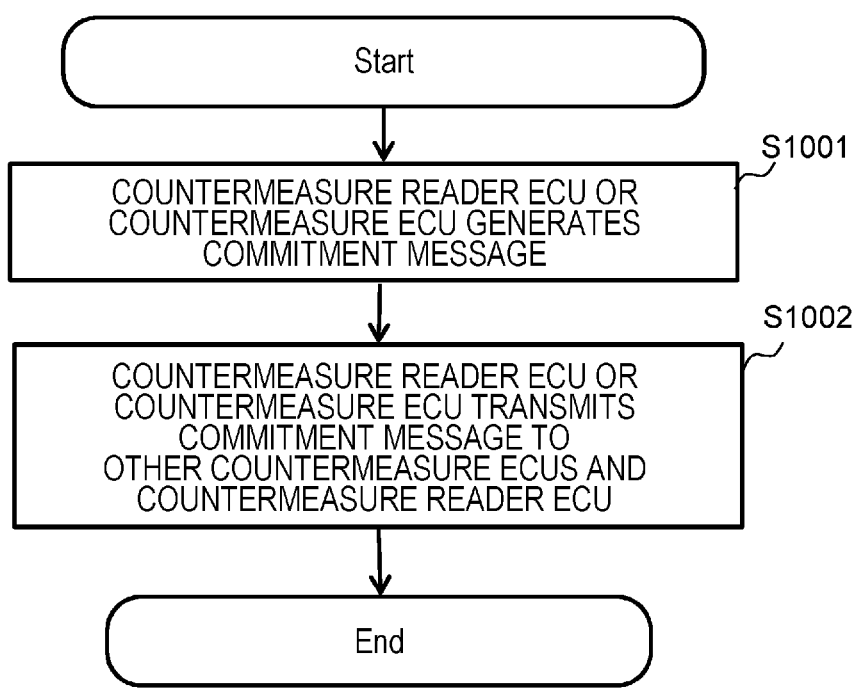
FIG. 10 illustrates a flow of a process in a first half of a commitment phase according to the first embodiment of the present invention.

FIG. 10 illustrates a flow of a process of the first half of the commitment phase according to the embodiment. In the countermeasure reader ECU 101 or each countermeasure ECU 102, the message generation units 223 and 323 generate a commitment message with the message syntax shown in the above Formula (4) based on the preparation message stored in the message storage units 211 and 311 (S1001). The commitment message generated here is stored in the message storage units 211 and 311. Then, the connection control units 221 and 321 transmit the generated commitment message to all the other countermeasure ECUs 102 and the countermeasure reader ECU 101 using the interface units 201 and 301 (S1002).

Figure 11:
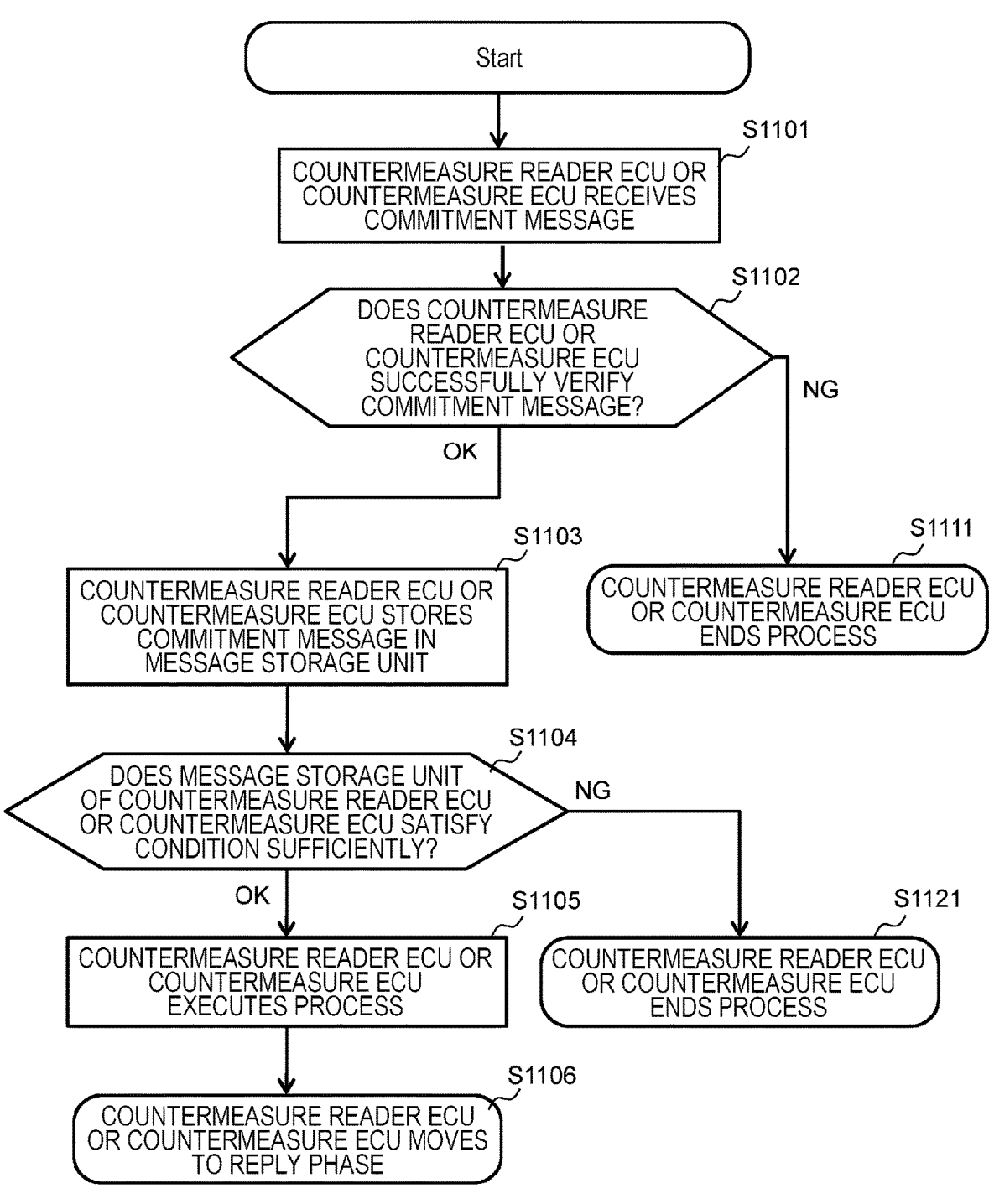
FIG. 11 illustrates a flow of a process in a second half of the commitment phase according to the first embodiment of the present invention.

FIG. 11 illustrates a flow of a process in the second half of the commitment phase according to the embodiment. When the countermeasure reader ECU 101 or each countermeasure ECU 102 receives the commitment message transmitted from another countermeasure ECU 102 or the countermeasure reader ECU 101 (S1101), the message verification unit 222 or 322 verifies the commitment message (S1102). Here, the verification of the commitment message executed by the message verification unit 222 or 322 includes, for example, at least one of the following verification processes.

(Verification 3-1) Validity of a combination of a body and a signature of the commitment message is verified using the public key of the countermeasure reader ECU 101 or the countermeasure ECU 102 of a commitment message transmission source stored in the public key DB 213 or 313.

(Verification 3-2) It is verified that the view value v included in the commitment message matches the view value 214 or 314 maintained in the own storage unit 202 or 302.

(Verification 3-3) It is verified that the sequence number n included in the commitment message falls within a preset acceptable value range.

When the verification of the commitment message fails (NG in S1102), the countermeasure reader ECU 101 or each countermeasure ECU 102 discards the commitment message and ends the process (S1111). When the verification of the commitment message is successful (OK in S1102), the countermeasure reader ECU 101 or each countermeasure ECU 102 stores the commitment message in the message storage unit 211 or 311 (S1103). Then, the message verification units 222 or 322 verifies the sufficiency of the commitment message set stored in the own message storage unit 211 or 311 (S1104). Here, the verification of the sufficiency of the commitment message set executed by the message verification unit 222 or 322 includes, for example, at least one of the following verification processes.

(Verification 3-4) It is verified that the pre-preparation message including a countermeasure request message m giving a hash value of the same value as the hash value d included in the commitment message is stored in the message storage unit 211 or 311.

(Verification 3-5) It is verified that three or more commitment messages each including the same view value v, sequence number n, countermeasure content q, and hash value d as the pre-preparation message stored in the message storage unit 211 or 311 are stored in the message storage unit 211 or 311. Here, a verification target commitment message includes a commitment message generated by the countermeasure reader ECU 101 or each countermeasure ECU 102 itself.

When the verification of the sufficiency of the commitment message set is successful (OK in S1104), the countermeasure reader ECU 101 or each countermeasure ECU 102 executes the s indicated by the countermeasure content q as the process security countermeasure based on the countermeasure content q (S1105), and then moves the process to the reply phase (S1106). When the verification of the sufficiency of the commitment message set fails (NG in S1104), the countermeasure reader ECU 101 or each countermeasure ECU 102 discards the commitment message and ends the process (S1121).

Figure 12:
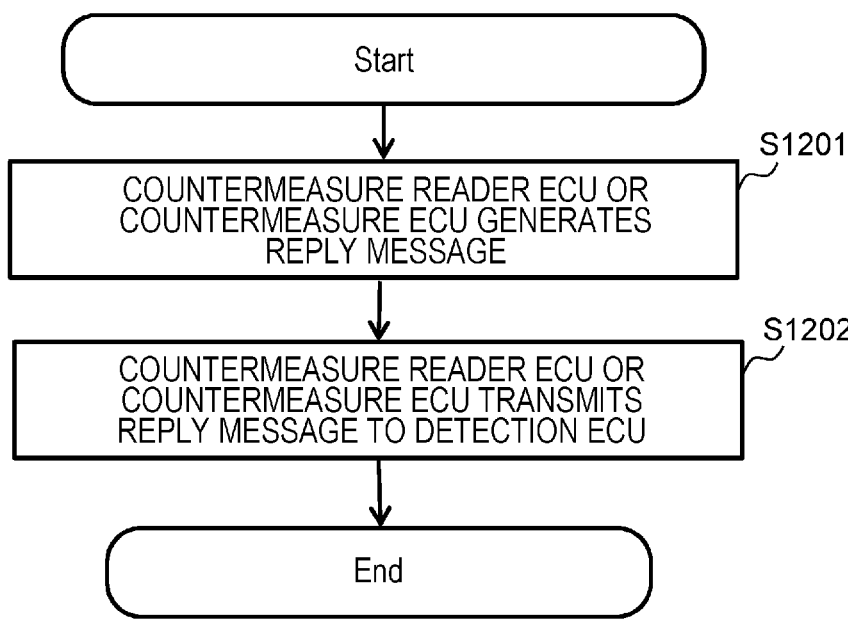
FIG. 12 illustrates a flow of a process of a first half of a reply phase according to the first embodiment of the present invention.

FIG. 12 illustrates a flow of a process of the first half of the reply phase according to the embodiment. In the countermeasure reader ECU 101 or the countermeasure ECU 102, the message generation unit 223 or 323 generates a reply message with the message syntax shown in the above Formula (5) based on the countermeasure content executed in the commitment phase and the result (S1201). Then, the connection control unit 221 or 321 transmits the generated reply message to the detection ECU 103 using the interface unit 201 or 301 (S1202).

Figure 13:
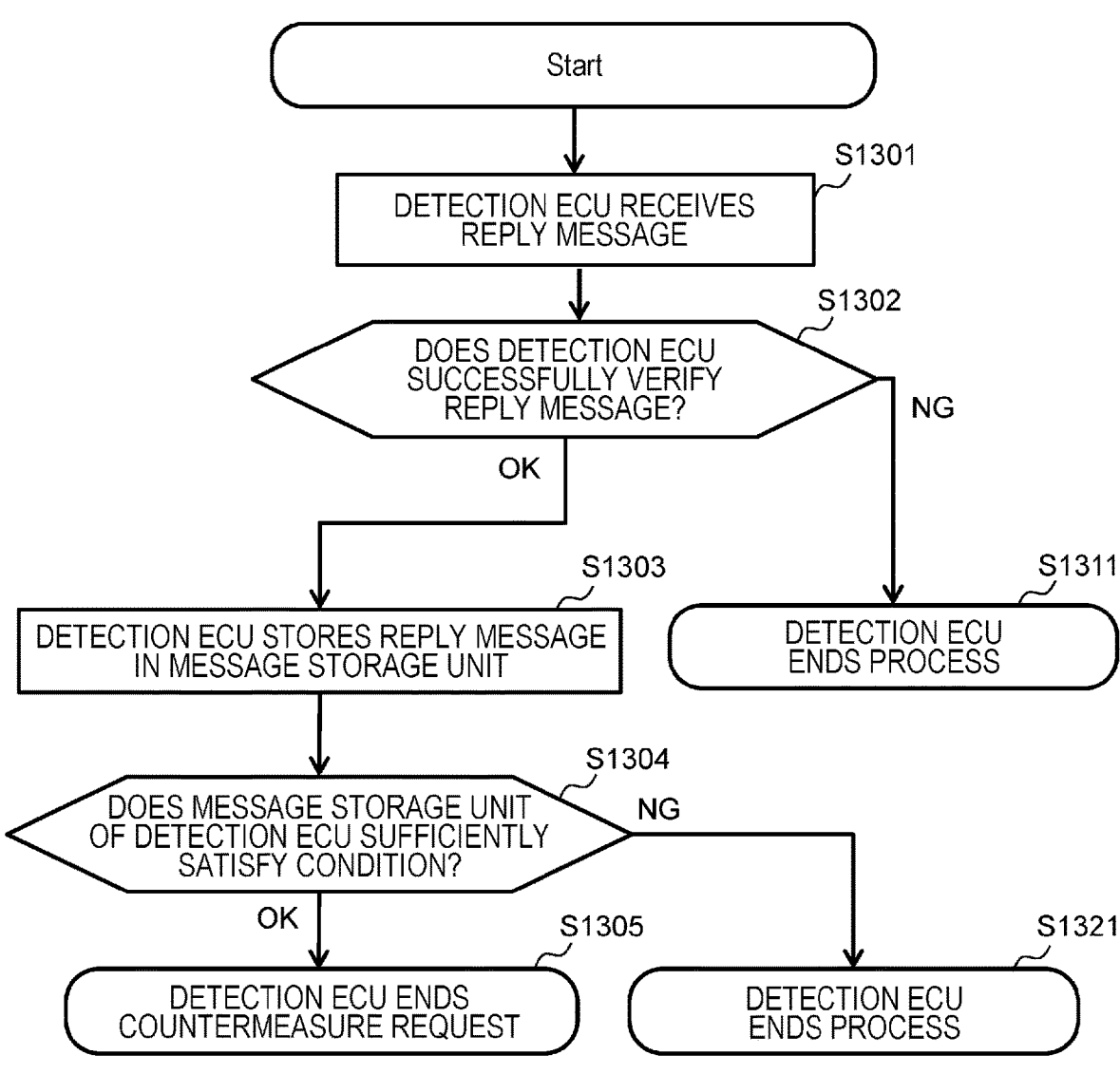
FIG. 13 illustrates a flow of a process in a second half of the reply phase according to the first embodiment of the present invention.

FIG. 13 illustrates a flow of a process of the second half of the reply phase according to the embodiment. When the detection ECU 103 receives the reply message transmitted from the countermeasure ECU 102 or the countermeasure reader ECU 101 (S1301), the message verification unit 422 verifies the reply message (S1302). Here, verification of the reply message executed by the message verification unit 422 includes, for example, the following verification process.

(Verification 4-1) Validity of a combination of a body and a signature of the reply message is verified using the public key of the countermeasure reader ECU 101 or the countermeasure ECU 102 of a transmission source of the reply message stored in the public key DB 413.

When the verification of the reply message fails (NG in S1302), the detection ECU 103 discards the reply message and ends the process (S1311). When the verification of the reply message is successful (OK in S1302), the detection ECU 103 stores the reply message in the message storage unit 411 (S1303). Then, the message verification unit 422 verifies the sufficiency of the reply message set stored in the message storage unit 411 (S1304). Here, the verification of the sufficiency of the reply message set executed by the message verification unit 422 includes, for example, the following verification process.

(Verification 4-2) It is verified that two or more reply messages including the same countermeasure content q and execution result r are stored in the message storage unit 411.

When the verification of the sufficiency of the reply message set is successful (OK in S1304), the detection ECU 103 determines that each of the countermeasure ECUs 101 and 102 executes an appropriate countermeasure against the detected security event and has been completed the countermeasure against the security event, and ends the countermeasure request (S1305). When the verification of the sufficiency of the reply message set fails (NG in S1304), the detection ECU 103 discards the reply message and ends the process (S1321).

According to the embodiment, even if one ECU of the countermeasure reader ECU 101 or the countermeasure ECU 102 undergoes a cyberattack and is freely operated by an attacker, the remaining ECUs can agree on the countermeasure content and execute countermeasures according to the countermeasure content. Accordingly, a countermeasure function that has resistance to the cyberattack can be implemented.

According to the above-described first embodiment of the present invention, the following operational advantageous effects are obtained.

(1) The in-vehicle system 100 mounted in the vehicle includes a plurality of ECUs. The plurality of ECUs include at least one detection ECU 103 and at least four countermeasure ECUs 101 and 102. At least one of the countermeasure ECUs 101 and 102 is set in the countermeasure reader ECU 101. When the occurrence of the security event related to the security abnormality is detected (S601), the detection ECU 103 transmits a countermeasure request message including the detected content o of the security event to the countermeasure reader ECU 101 (S602). When the countermeasure request message is received from the detection ECU 103 (S603), the countermeasure reader ECU 101 specifies countermeasure content q for the security event (S701), and transmits the pre-preparation message including the detected content o and the countermeasure content q to the other countermeasure ECUs 102 (S702). Each of the countermeasure ECUs 102 excluding the countermeasure reader ECU 101 verifies consistency between the detected content o included in the received pre-preparation message and the countermeasure content q when the pre-preparation message is received from the countermeasure reader ECU 101 (S703), and transmits the preparation message including the countermeasure content q to the other countermeasure ECUs 102 (S802) when it is determined that there is the consistency (OK in S703). When each of the countermeasure ECUs 101 and 102 receives the preparation message from each of the other countermeasure ECUs 102 (S901), it is determined whether the countermeasure content q included in each of the received preparation messages matches the countermeasure content q included in the pre-preparation message (S904). When the countermeasure content q of two or more of the preparation messages matches the pre-preparation message (OK in S904), the commitment message including the countermeasure content q is transmitted to the other countermeasure ECUs 101 and 102 (S1002). Then, when the commitment message is received from each of the other countermeasure ECUs 101 and 102 (S1101), it is determined whether the countermeasure content q included in each of the transmitted or received commitment messages matches the countermeasure content q included in the pre-preparation message (S1104). When the countermeasure content q matches the pre-preparation message for three or more commitment messages (OK in S1104), a security countermeasure based on the countermeasure content is executed (S1105). In this way, even when the ECU executing the countermeasure process in the in-vehicle system 100 undergoes a cyberattack, it is possible to prevent damage from the cyberattack.

(2) Each of the countermeasure ECUs 101 and 102 transmits a reply message including countermeasure content q and the execution result r of the security countermeasure to the detection ECU 103 (S1202). When each of the reply messages is received from the countermeasure ECUs 101 and 102 (S1301), the detection ECU 103 compares the countermeasure content q and the execution result r included in each of the received reply messages (S1304). When the countermeasure content q and the execution result r are the same for two or more reply messages (OK in S1304), it is determined that the countermeasure against the security event has been completed (S1305). In this way, it is possible to reliably determine that the countermeasure against the security event detected by the detection ECU 103 has been completed.

(3) In the in-vehicle system 100, the countermeasure ECU 102 set in the countermeasure reader ECU 101 may be changed at each predetermined time. In this way, even when a specific ECU undergoes a cyberattack, another ECU can be set as the countermeasure reader ECU 101 to execute a security countermeasure.

(4) The countermeasure ECUs 101 and 102 are ECUs used in the in-vehicle system 100 mounted in a vehicle and include: the countermeasure determination units 225 and 325 that determine countermeasure content for a security event related to a security abnormality; the message generation units 223 and 323 that generate messages to be transmitted to and received and from the other ECUs; interface units 201 and 301 that transmit and receive the messages generated by the message generation units 223 and 323 to and from the other ECUs; and message verification units 222 and 322 that verify the messages received by the interface units 201 and 301, and determine whether to execute a security countermeasure based on the countermeasure content determined by the countermeasure determination units 225 and 325 based on verification results of the messages by the message verification units 222 and 322. In this way, it is possible to implement the in-vehicle system 100 capable of preventing damage from a cyberattack even when the specific ECU undergoes the cyberattack.

(5) In the countermeasure ECU 102, the interface unit 301 receives the pre-preparation message including the detected content o for the occurrence of the security event and the first countermeasure content q for the security event from the countermeasure reader ECU 101 which is another ECU. The message verification unit 322 verifies the pre-preparation message based on consistency between the second countermeasure content q determined by the countermeasure determination unit 325 based on the detected content o included in the pre-preparation message received by the interface unit 301 and the first countermeasure content q included in the pre-preparation message (S703). When the verification of the pre-preparation message by the message verification unit 322 is successful (OK in S703), the message generation unit 323 generates the preparation message including the third countermeasure content q based on the first or second countermeasure content (S801). The interface unit 301 transmits the preparation message generated by the message generation unit 323 to each of the other countermeasure ECUs 102 (S802) and receives the preparation message transmitted from each of the three or more of the other countermeasure ECUs 102 (S901). The message verification unit 322 verifies the preparation message by determining whether the third countermeasure content q included in each preparation message received by the interface unit 301 matches the first countermeasure content q included in the pre-preparation message and determining whether the third countermeasure content q matches the first countermeasure content q for two or more preparation messages (S904). When the verification of the preparation message by the message verification unit 322 is successful (OK in S904), the message generation unit 323 generates the commitment message including the third countermeasure content q (S1001). The interface unit 301 transmits the commitment message generated by the message generation unit 323 to the other countermeasure ECUs 101 and 102 (S1002) and receives the commitment message transmitted from each of three or more of the other countermeasure ECUs 101 and 102 (S1101). The message verification unit 322 determines whether the third countermeasure content q included in each commitment message transmitted or received by the interface unit 301 matches the first countermeasure content q included in the pre-preparation message, and verifies the commitment message by determining whether the third countermeasure content q matches the first countermeasure content q for the three or more commitment messages (S1104). As a result, when verification of the commitment message is successful by the message verification unit 322 (OK in S1104), the countermeasure ECU 102 executes the security countermeasure based on the third countermeasure content q (S1105). In this way, it is possible to easily construct the in-vehicle system 100 capable of executing an appropriate countermeasure against a cyberattack.

(6) The other ECUs include the detection ECU 103 that detects occurrence of a security event and transmits a countermeasure request message including the detected content o. In the countermeasure reader ECU 101, the interface unit 201 receives the countermeasure request message from the detection ECU 103 (S603). The message generation unit 223 generates a pre-preparation message using the counter-measure content q determined by the countermeasure determination unit 225 based on the detected content o included in the countermeasure request message received by the interface unit 201 as the first countermeasure content q (S701). The interface unit 201 transmits the pre-preparation message generated by the message generation unit 223 to each of the other countermeasure ECUs 102 (S702). In this way, when the security event occurs in the in-vehicle system 100, it is possible to reliably detect the security event and notify each countermeasure ECU 102 of the security event.

Second Embodiment

Next, a second embodiment of the present invention will be described. At that time, differences from the first embodiment will be mainly described, and description of common points with those of the first embodiment will be omitted or simplified.

Figure 14:
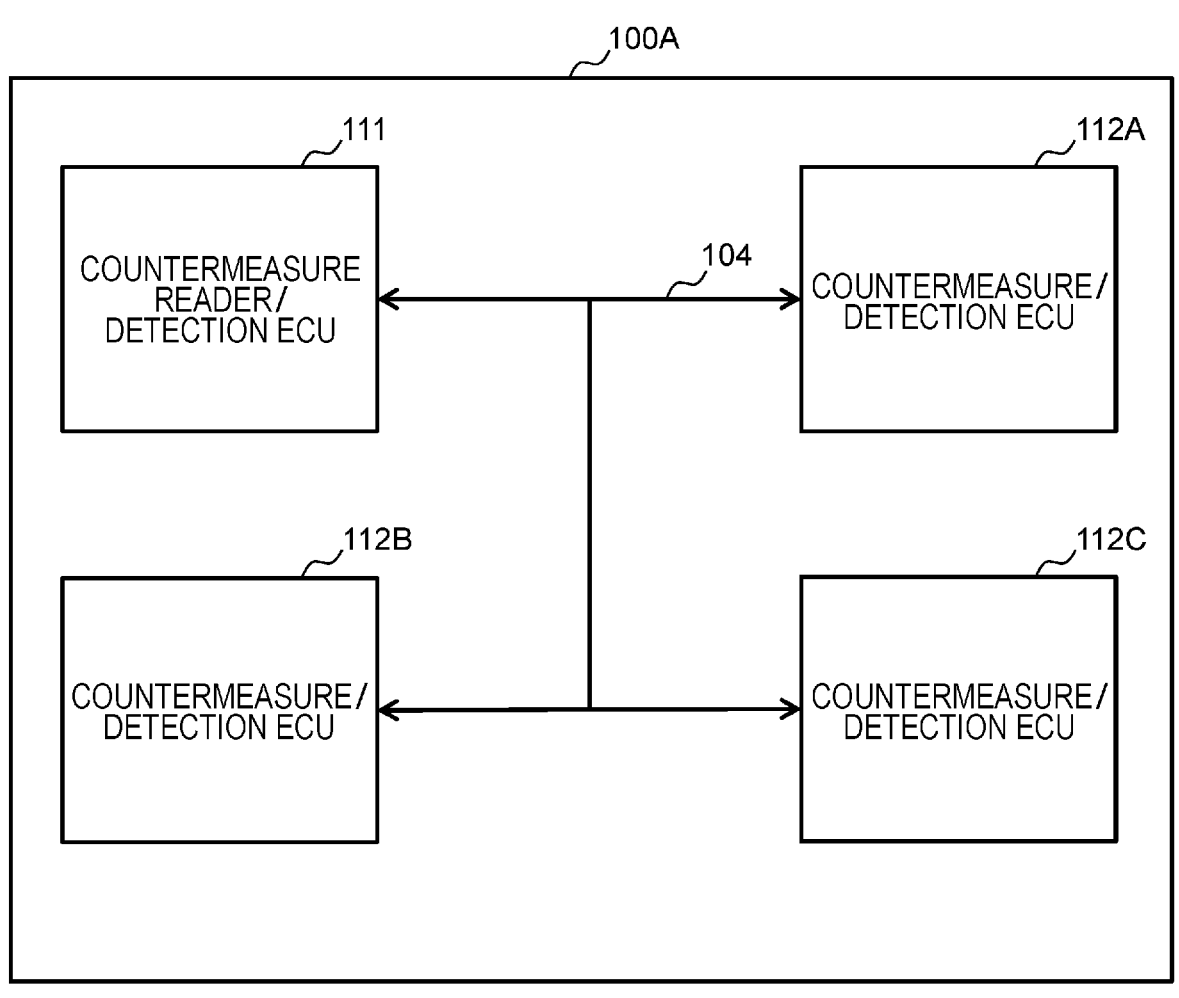
FIG. 14 illustrates a configuration of an in-vehicle system according to a second embodiment of the present invention.

FIG. 14 illustrates a configuration of an in-vehicle system 100A according to a second embodiment of the present invention. In the in-vehicle system 100A according to the embodiment, each ECU both the has functions of the countermeasure ECU and the detection ECU. Specifically, the ECU 111 serves as both the countermeasure reader ECU and the detection ECU, and ECUs 112A, 112B, and 112C serve as both the countermeasure ECU and the detection ECU. Therefore, hereinafter, the ECU 111 is referred to as a "countermeasure reader/detection ECU", and the ECUs 112A to 112C are referred to as "countermeasure/detection ECUs". The countermeasure reader/detection ECU 111 and the countermeasure/detection ECU 112 may be collectively referred to as a "countermeasure/detection ECU 111 and 112".

The countermeasure reader/detection ECU 111 includes constituents of the detection ECU 103 illustrated in FIG. 4 in addition to the constituents of the countermeasure reader ECU 101 illustrated in FIG. 2. The countermeasure/detection ECU 112 includes the constituents of the detection ECU 103 illustrated in FIG. 4 in addition to the constituents of the countermeasure ECU 102 illustrated in FIG. 3. However, only one of the constituents with duplication functions may be provided.

Figure 15:
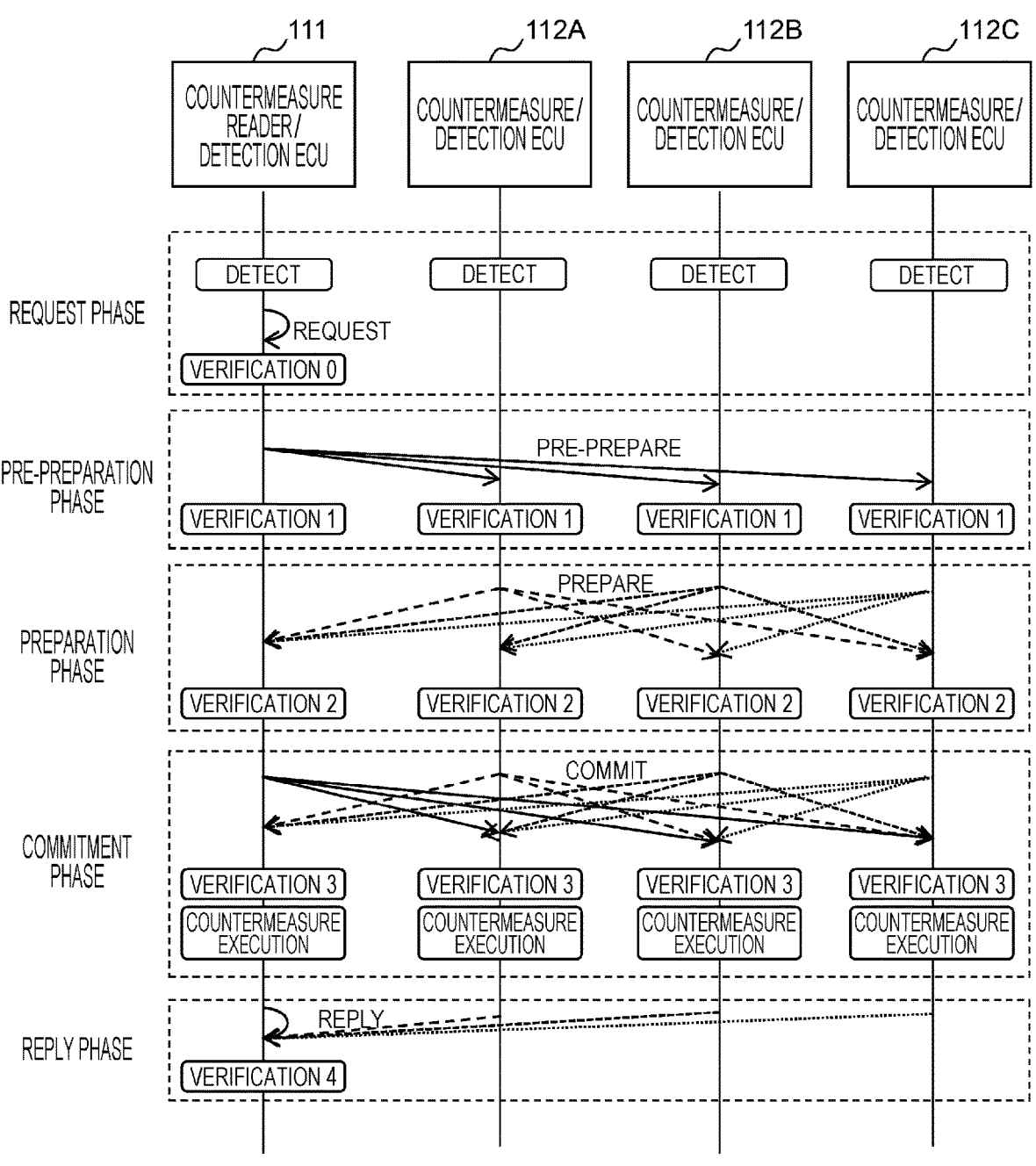
FIG. 15 illustrates an outline of a sequence of communication and a process according to the second embodiment of the present invention.

FIG. 15 illustrates an outline of a sequence of communication and a process between the countermeasure reader/detection ECU 111 and the countermeasure/detection ECUs 112A to 112C according to the embodiment.

In the request phase, one of the countermeasure reader/detection ECU 111 or the countermeasure/detection ECUs 112A to 112C first detects the security event. For example, when the countermeasure reader/detection ECU 111 detects a security event, the countermeasure reader/detection ECU 111 issues a countermeasure request message to the own ECU. FIG. 15 illustrates an example in which the countermeasure reader/detection ECU 111 detects the security event. When any of the countermeasure/detection ECUs 112A to 112C detects the security event, the ECU may issue a countermeasure request message and transmit the countermeasure request message to the countermeasure reader/detection ECU 111. When the countermeasure request message is received, the countermeasure reader/detection ECU 111 verifies the countermeasure request message.

When the verification of the countermeasure request message is successful, the countermeasure reader/detection ECU 111 subsequently issues and transmits the pre-preparation message to the countermeasure/detection ECUs 112A to 112C in the pre-preparation phase. When the pre-preparation message is received, the countermeasure/detection ECUs 112A to 112C each verify the received pre-preparation message.

Then, when the verification of the pre-preparation message is successful, the countermeasure/detection ECUs 112A to 112C each issue the preparation message and transmit the preparation message to the countermeasure reader/detection ECU 111 and the other countermeasure/detection ECU 112 in the preparation phase. When the preparation message is received, the countermeasure reader/detection ECU 111 and the countermeasure/detection ECUs 112A to 112C verify the received preparation message.

Further, when the verification of the preparation message is successful, next in the commitment phase, the countermeasure reader/detection ECU 111 and the countermeasure/detection ECUs 112A to 112C each issue the commitment message and transmit the commitment message to the other countermeasure/detection ECUs 111 and 112. When the commitment message is received, the countermeasure reader/detection ECU 111 and the countermeasure/detection ECUs 112A to 112C each verify the received commitment execute the message and agreed countermeasure.

Finally, the countermeasure reader/detection ECU 111 and the countermeasure/detection ECUs 112A to 112C each issue the reply message in the reply phase, and transmit the reply message to the countermeasure reader/detection ECU 111 that has issued the countermeasure request message. When the reply message is received, the countermeasure reader/detection ECU 111 verifies the received reply message and ends the countermeasure request for the security event.

Figure 16:
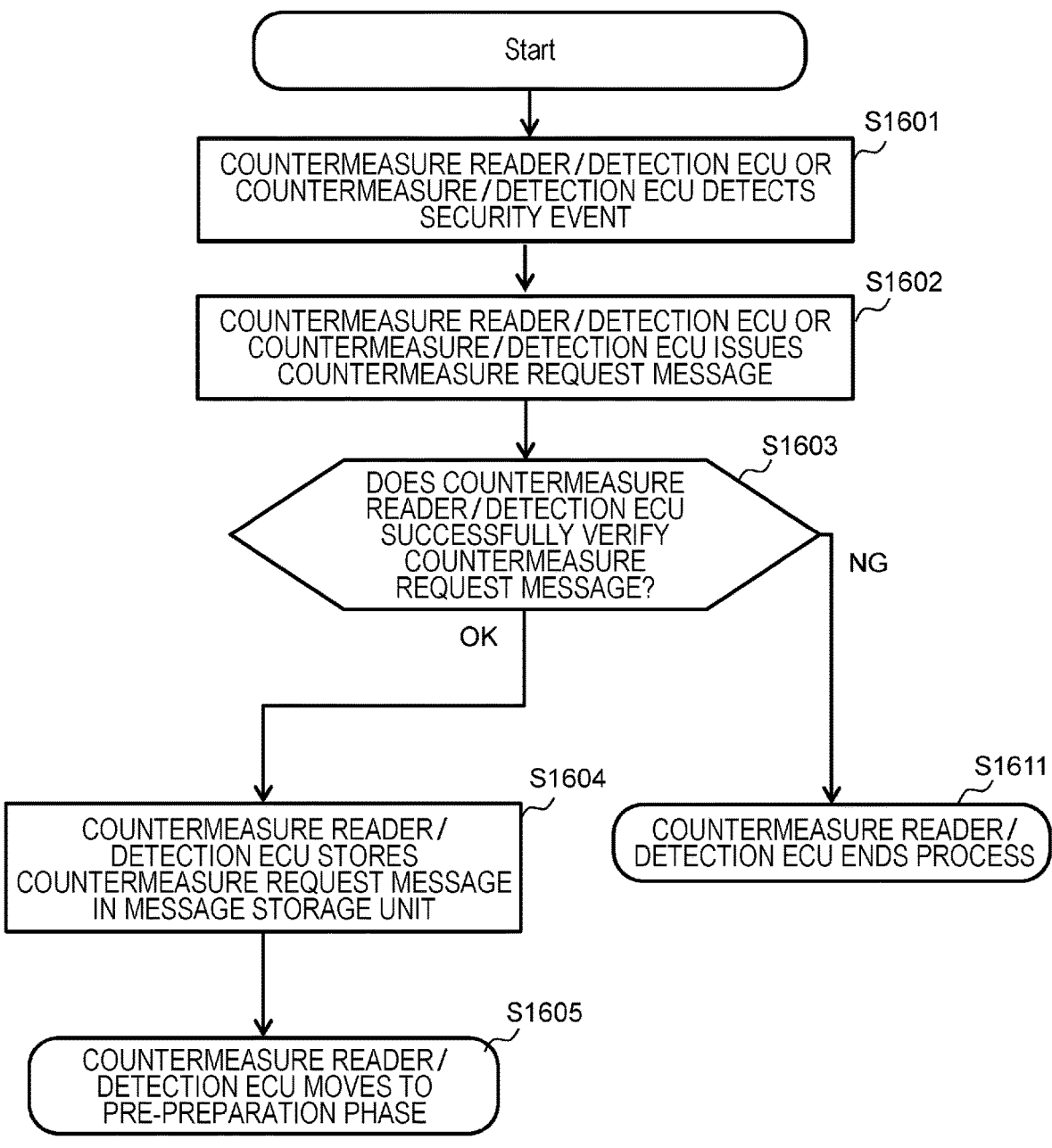
FIG. 16 illustrates a flow of a process of a request phase according to the second embodiment of the present invention.

FIG. 16 illustrates a flow of a process of the request phase according to the embodiment. When the security event is detected (S1601), the countermeasure reader/detection ECU 111 or the countermeasure/detection ECU 112 issues the countermeasure request message with the message syntax shown in the above Formula (1) (S1602). When the countermeasure reader/detection ECU 111 generates the countermeasure request message, the countermeasure request message is maintained in the countermeasure reader/detection ECU 111 as it is. When the countermeasure reader/detection ECU 112 generates the countermeasure request message, the countermeasure request message is transmitted to the countermeasure reader/detection ECU 111.

When the countermeasure request message is generated and received, the countermeasure reader/detection ECU 111 executes processes similar to the processes S603, S604, S605, and S611 in FIG. 6 (S1603, S1604, S1605, and S1611). When the countermeasure request message is generated, the process S1603 is omitted and the process may directly proceed to processes S1604 and S1605.

Figure 17:
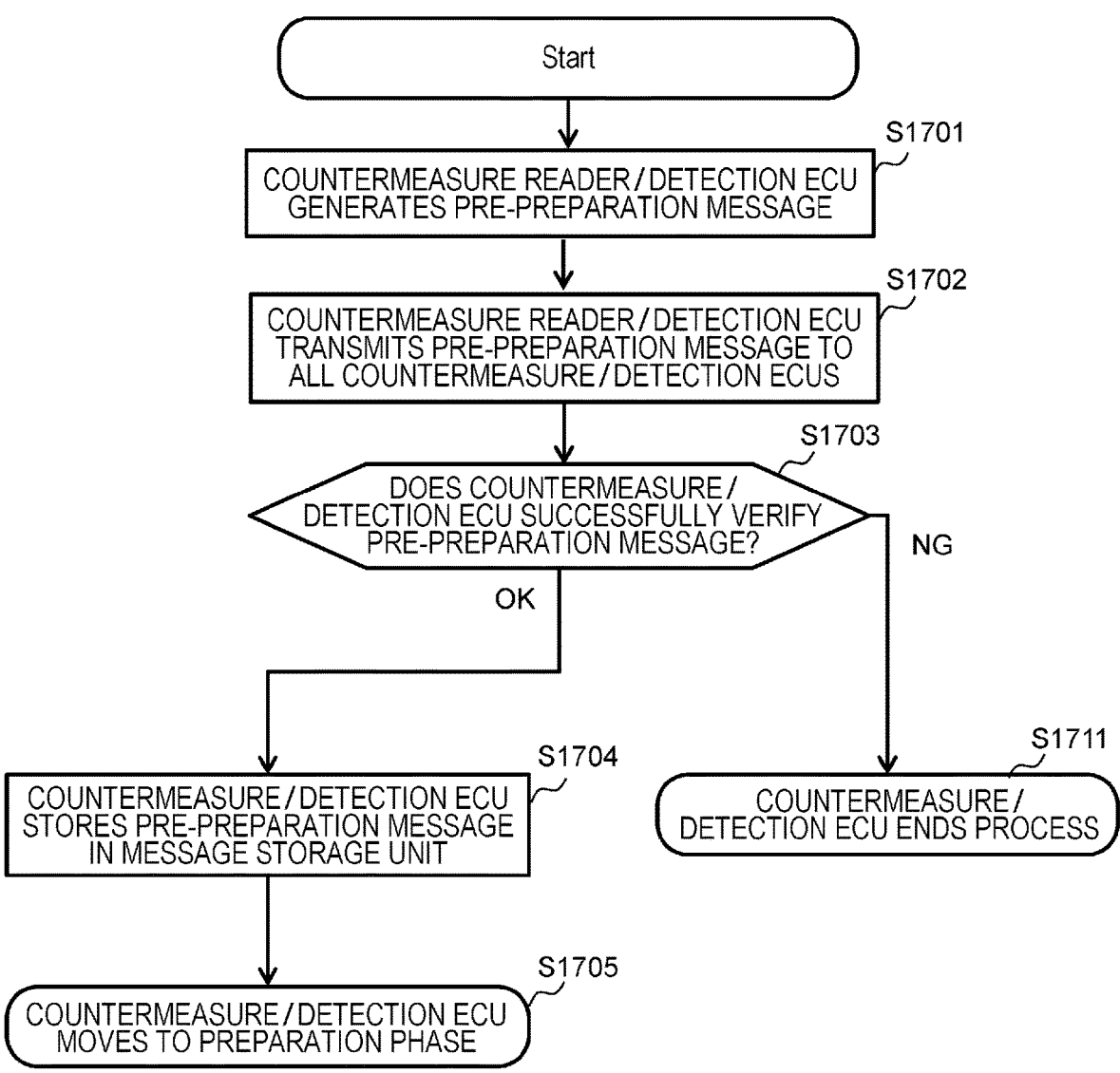
FIG. 17 illustrates a flow of a process of a pre-preparation phase according to the second embodiment of the present invention.

FIG. 17 illustrates a flow of a process of the pre-preparation phase according to the embodiment. The countermeasure reader/detection ECU 111 executes processes similar to the processes S701 and S702 in FIG. 7 (S1701 and S1702).

In each of the countermeasure/detection ECUs 112 receiving the pre-preparation message, the message verification unit 322 verifies the pre-preparation message (S1703). Here, the verification of the pre-preparation message executed by the message verification unit 322 includes, for example, the following verification process in addition to each verification process executed in the process S703 of FIG. 7.

(Verification 1-6) It is verified that the detected content o described in the countermeasure request message m included in the pre-preparation message is not inconsistent with the security event detected in the process S1601 of FIG. 16.

When the verification of the pre-preparation message is successful (OK in S1703), each of the countermeasure/detection ECUs 112 executes processes similar to the processes S704 and S705 of FIG. 7 (S1704 and S1705). When the verification of the fails (NG in S1703), each of the pre-preparation message countermeasure/detection ECUs 112 discards the pre-preparation message and ends the process as in the process S711 of FIG. 7 (S1711).

In the preparation phase and the subsequent phases, the countermeasure reader/detection ECU 111 and the countermeasure/detection ECU 112 execute processes similar to those in FIGS. 8 to 13, respectively.

According to the embodiment, even when one of the countermeasure/detection ECUS 111 and 112 undergoes a cyberattack and is freely operated by an attacker, the remaining ECUs can agree on the countermeasure content and execute the same countermeasure. Accordingly, it is possible to implement the detection function and the countermeasure function resistant to the cyberattack.

According to the above-described second embodiment of the present invention, the countermeasure/detection ECUs 111 and 112 serve as both the countermeasure ECUs 101 and 102 and the detection ECU 103 in the first embodiment. In this way, it is possible to reduce the number of ECUs included in the in-vehicle system 100A, and it is possible to further improve the resistance to a cyberattack.

Third Embodiment

Next, a third embodiment of the present invention will be described. At that time, differences from the first embodiment will be mainly described, and description of common points with those of the first embodiment will be omitted or simplified.

In the embodiment, a configuration is the same as the configuration of the in-vehicle system 100 of FIG. 1 described in the first embodiment.

Figure 18:
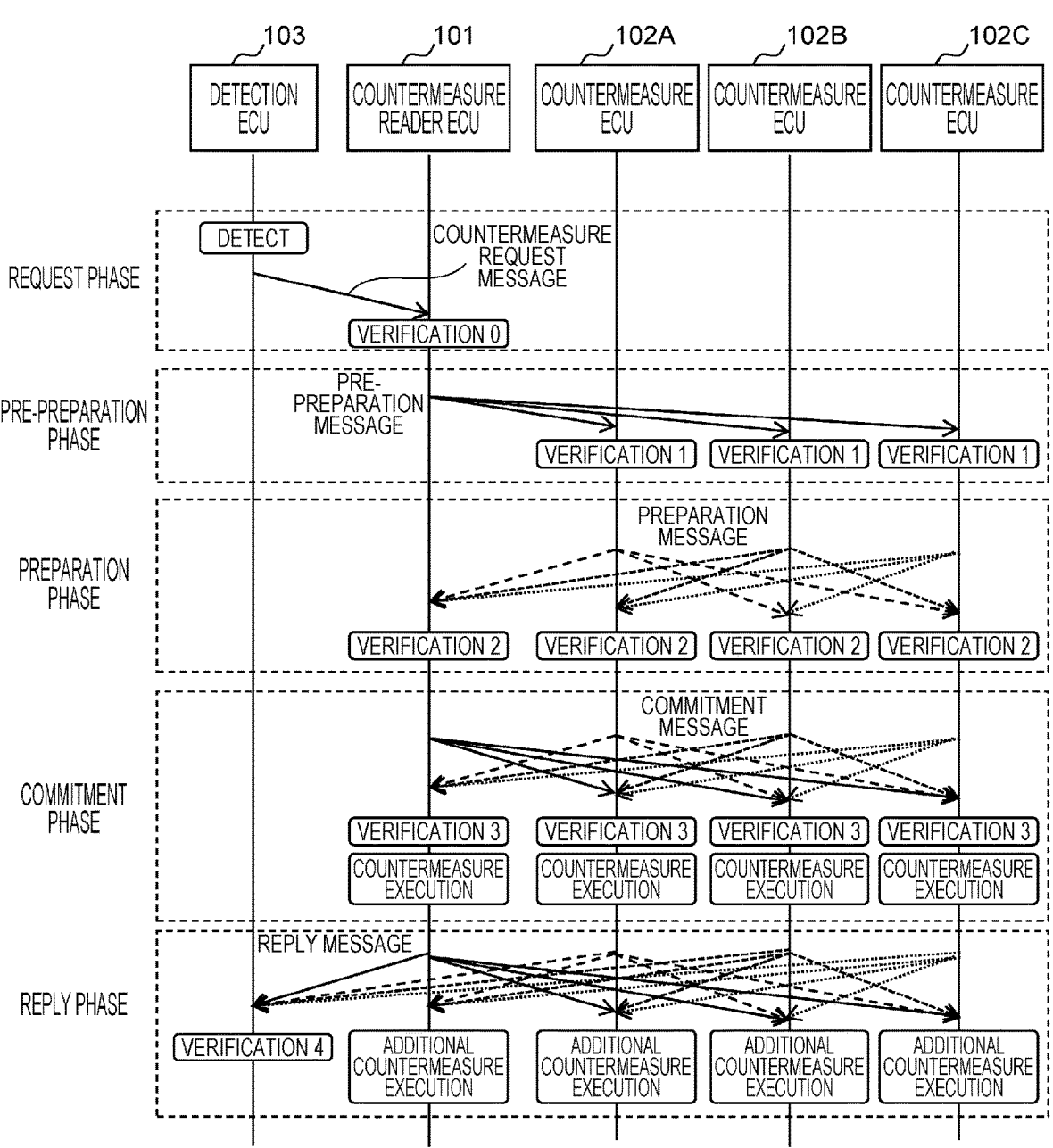
FIG. 18 illustrates an outline of a sequence of communication and a process according to a third embodiment of the present invention.

FIG. 18 illustrates an outline of a sequence of communication and a process among the countermeasure reader ECU 101, the countermeasure ECUs 102A to 102C, and the detection ECU 103 according to the embodiment. As illustrated in FIG. 18, the process in the embodiment includes five phases of a request phase, a pre-preparation phase, a preparation phase, a commitment phase, and a reply phase. The request phase, the pre-preparation phase, the preparation phase, and the commitment phase are processes similar to those in FIG. 5 described in the first embodiment, and only the reply phase is different from that in FIG. 5.

In the reply phase, the countermeasure reader ECU 101 and the countermeasure ECUs 102A to 102C each issue a reply message and transmit the reply message to the detection ECU 103 and the other countermeasure ECUs 101 and 102. When the reply message is received, the detection ECU 103 verifies the received reply message, and terminates the countermeasure request against the security event. The countermeasure reader ECU 101 and each of the countermeasure ECUs 102A to 102C receiving the reply message from each of the other countermeasure ECUs 101 and 102 verify each reply message, execute an additional countermeasure as necessary, and end the countermeasure in response to a countermeasure request.

FIG. 19 illustrates a flow of a process of the first half of the reply phase according to the embodiment. In the countermeasure reader ECU 101 or the countermeasure ECU 102, the message generation unit 223 or 323 generates the reply message with the message syntax shown in the above Formula (5) as in the process S1201 of FIG. 12 (S1901). Then, the connection control unit 221 or 321 transmits the generated reply message to all the other countermeasure ECUs 102, the countermeasure reader ECU 101, and the detection ECU 103 by using the interface unit 201 or 301 (S1902).

FIG. 20 illustrates a flow of a process of the countermeasure reader ECU 101 or the countermeasure ECU 102 in the process of the second half of the reply phase according to the embodiment. The flow of the process of the detection ECU 103 is similar to that of FIG. 13. When the countermeasure reader ECU 101 or the countermeasure ECU 102 receives the reply message transmitted from the other countermeasure ECUs 102 or the countermeasure reader ECU 101 (S2001), the message verification unit 222 or 322 verifies the reply message (S2002). Here, the reply message can be verified by a method similar to the process S1302 in FIG. 13.

When the verification of the reply message fails (NG in S2002), the countermeasure reader ECU 101 or the countermeasure ECU 102 discards the reply message and ends the process (S2011). When the verification of the reply message is successful (OK in S2002), the countermeasure reader ECU 101 or the countermeasure ECU 102 stores the reply message in the message storage units 211 or 311 (S2003) and moves the process to the additional countermeasure.

Figure 21:
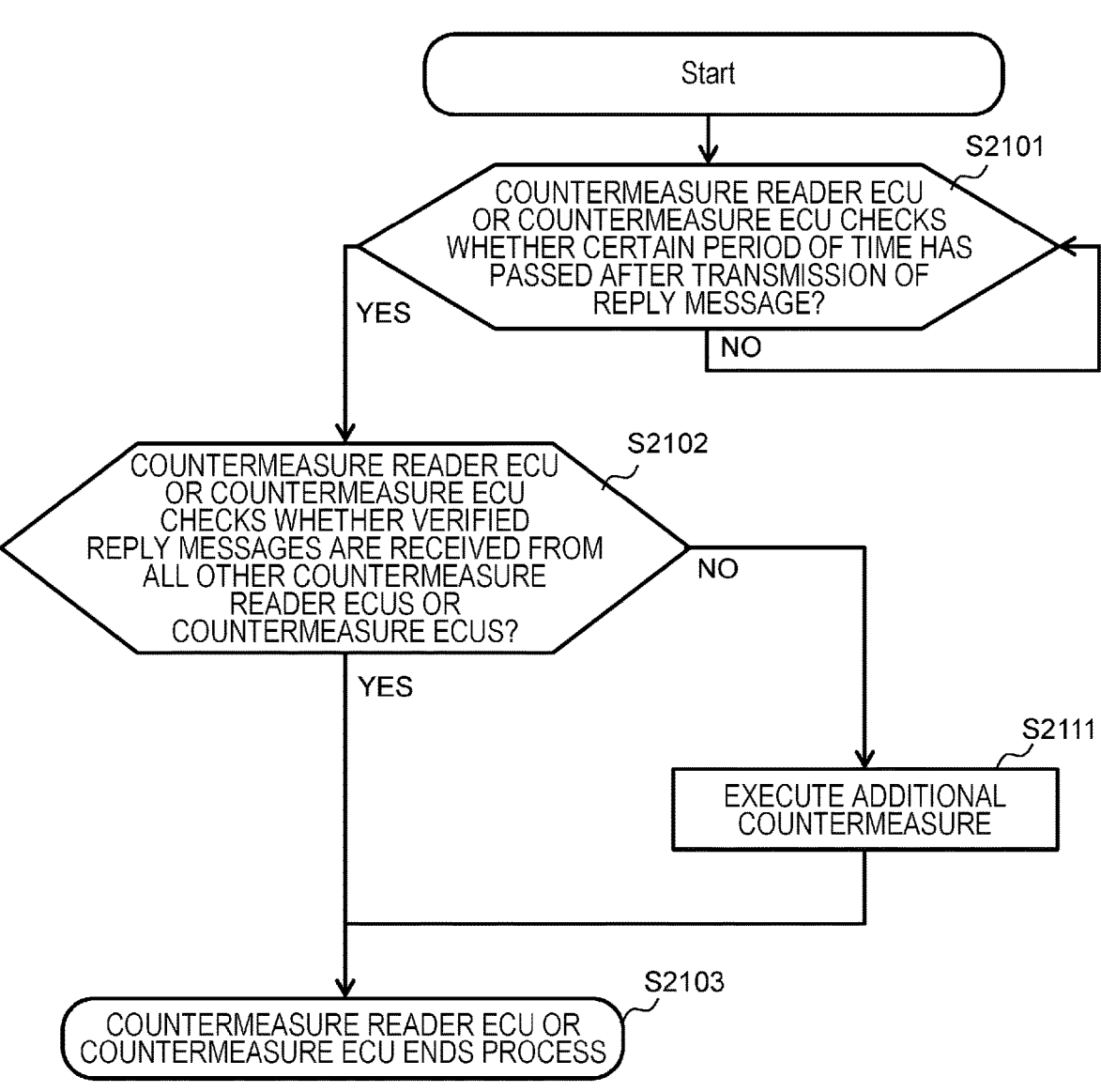
FIG. 21 illustrates a flow of a process of additional countermeasures in a reply phase according to the third embodiment of the present invention.

FIG. 21 illustrates a flow of a process of the additional countermeasure in the reply phase according to the embodiment. The countermeasure reader ECU 101 or the countermeasure ECU 102 checks whether a certain period of time has passed since the own ECU transmits the reply message to the other ECUs in the process S1902 of FIG. 19 (S2101). The certain period of time may be, for example, 1 minute, but is not limited thereto. When the certain period of time has not passed (NO in S2101), the process S2101 is continued. When the certain period of time has passed (YES in S2101), the process moves to a subsequent step.

Subsequently, the countermeasure reader ECU 101 or the countermeasure ECU 102 checks the reply message stored in the message storage unit 211 or 311 and determines whether a verified reply message has been received from all the other countermeasure ECUs 102 or the countermeasure reader ECU 101 (S2102). When the countermeasure reader ECU 101 or the countermeasure ECU 102 has received the replay message (YES in S2102), the process ends (S2103). When there is the countermeasure ECU 102 or the countermeasure reader ECU 101 that has not received the verified reply message (NO in S2102), the countermeasure reader ECU 101 or the countermeasure ECU 102 executes the additional countermeasure corresponding to the countermeasure ECU 101 or 102 (S2111). After the additional countermeasure is executed, the process ends (S2103).

In the process S2111, for example, the identifier i of the countermeasure ECUs 101 and 102 that has not received the verified reply message and the implemented countermeasure content q are received as an input, and the processing content to be implemented as the additional countermeasure against the security event is determined by referring to a preset reference table. Accordingly, the countermeasure ECU 102 or the countermeasure reader ECU 101 alternatively executes a security countermeasure to be executed by the other countermeasure ECUs 101 and 102 to which the reply message has not been transmitted, as an additional countermeasure for the security event, for example. The method of determining the additional measure and the execution content are not limited thereto.

According to the embodiment, as in the first embodiment, even if one ECU of the countermeasure reader ECU 101 or the countermeasure ECU 102 undergoes a cyberattack and is freely operated by the attacker, the remaining ECUs can agree on the countermeasure content and execute the countermeasure in accordance with the countermeasure content. Further, it is possible to execute the additional countermeasure in which the remaining ECUs replace the countermeasure to be taken by the ECU operated by an attacker. Accordingly, it is possible to implement a countermeasure function further resistant to a cyberattack.

According to the above-described third embodiment of the present invention, each of the countermeasure ECUs 101 and 102 transmits a reply message including the execution result of the security countermeasure to the other countermeasure ECUs 101 and 102 (S1902), and determines whether to execute the additional countermeasure for the security event according to whether to transmit the reply message from the other countermeasure ECUs 101 and 102 (S2102). In this way, it is possible to appropriately determine whether to execute the required additional countermeasure in consideration of presence of the other countermeasure ECUs 101 and 102 that are not operating normally due to a reason that the ECU is operated by an attacker or the like.

Each of the countermeasure ECUs 101 and 102 can alternatively execute the security countermeasure to be executed by the other countermeasure ECUs 101 and 102 to which the reply message has not been transmitted as the additional countermeasure. In this way, when there is an ECU that does not normally operate among the countermeasure ECUs 101 and 102, it is possible to execute the additional countermeasure with the security countermeasure of that ECU is replaced by the remaining ECUs to realize further resistance to the cyberattack.

In each of the above-described embodiments, the example in which the in-vehicle systems 100 and 100A each include the four countermeasure ECUs or the countermeasure/detection ECU, and one of the countermeasure ECUs is set as the countermeasure reader ECU or the countermeasure reader/detection ECU has been described. However, the number of countermeasure ECUs or countermeasure/detection ECUs in the present invention is not limited thereto. The present invention can be applied by setting any number of countermeasure ECUs or the countermeasure/detection ECUs included in the in-vehicle system as long as a total of 3f+1 (where f is any positive integer) or more countermeasure ECUs or countermeasure/detection ECUs are included, and at least one of the countermeasure ECUs or the countermeasure/detection ECU is set as the countermeasure reader ECU or the countermeasure reader/detection ECU.

The above-described embodiments and various modifications are merely exemplary, and the present invention is not limited to the content as long as the features of the invention are not impaired. Although the various embodiments and modifications have been described above, the present invention is not limited to the content. Other aspects conceivable within the scope of the technical idea of the present invention are also included within the scope of the present invention.

REFERENCE SIGNS LIST

100, 100A in-vehicle system
101 countermeasure reader ECU
102, 102A, 102B, 102C countermeasure ECU
103 detection ECU
104 communication network
111 countermeasure reader/detection ECU
112, 112A, 112B, 112C countermeasure/detection ECU
201, 301, 401 interface unit
202, 302, 402 storage unit
203, 303, 403 arithmetic unit
211, 311, 411 message storage unit
212, 312, 412 secret key
213, 313, 413 public key DB
214, 314 view value
215 sequence number
221, 321, 421 connection control unit
222, 322, 422 message verification unit
223, 323, 423 message generation unit
224, 324, 424 signature generation unit
225, 325 countermeasure determination unit
414 detected content storage unit
425 abnormality detection unit

The invention claimed is:

1. An in-vehicle system mounted in a vehicle, the in-vehicle system comprising:

a plurality of electronic control devices;

wherein each of the plurality of electronic control devices includes at least one detection device and at least four countermeasure devices;

at least one of the countermeasure devices is set as a countermeasure reader device;

when occurrence of a security event related to a security abnormality is detected, the detection device transmits a countermeasure request message including detected content of the security event to the countermeasure reader device;

when the countermeasure request message is received from the detection device the countermeasure reader device specifies countermeasure content for the security event and transmits a pre-preparation message including the detected content and the countermeasure content to each countermeasure device;

when the pre-preparation message is received from the countermeasure reader device each of the countermeasure devices excluding the countermeasure reader device verifies consistency between the detected content included in the received pre-preparation message and the countermeasure content, and when it is determined that there is consistency between the detected content and the countermeasure content, each of the countermeasure devices transmits a preparation message including the countermeasure content to the other countermeasure devices;

when each of the preparation messages is received from the other countermeasure devices, each of the countermeasure devices determines whether the countermeasure content included in each of the received preparation messages matches the countermeasure content included in the pre-preparation message, and when the countermeasure content matches the countermeasure content included in the pre-preparation message in two or more of the preparation messages, each of the countermeasure devices transmits a commitment message including the countermeasure content to the other countermeasure devices; and when the commitment messages are each received from the other countermeasure device each of the countermeasure devices determines whether the countermeasure content included in each of the transmitted or received commitment messages matches the countermeasure content included in the countermeasure content included in the pre-preparation message, and when the countermeasure content matches the countermeasure content included in the pre-preparation message in three or more of the commitment messages, each of the countermeasure devices executes a security countermeasure based on the countermeasure content.

2. The in-vehicle system according to claim 1, wherein each of the countermeasure devices transmits a reply message including the countermeasure content and an execution result of the security countermeasure to the detection device; and when the reply messages are each received from the countermeasure devices, the detection device compares the countermeasure content and the execution result included in each of the received reply messages, and when the countermeasure content and the execution result are identical in two or more of the reply messages, the detection device determines that the countermeasure against the security event has been completed.

3. The in-vehicle system according to claim 1, wherein the countermeasure device set as the countermeasure reader device is changed at each predetermined time.

4. The in-vehicle system according to claim 1, wherein the countermeasure device also serves as the detection device.

5. The in-vehicle system according to claim 1, wherein each of the countermeasure devices transmits a reply message including an execution result of the security countermeasure to the other countermeasure devices, and determines whether to execute an additional countermeasure against the security event in accordance with whether the reply message is transmitted from the other countermeasure devices.

6. The in-vehicle system according to claim 5, wherein, each of the countermeasure devices substitutionally executes the security countermeasure to be executed by the countermeasure devices to which the reply message has not been transmitted.

7. An electronic control device used for an in-vehicle system mounted in a vehicle, the electronic control device comprising a processor executing computer instructions stored in a memory, which when executed causes the electronic control device to:

determine countermeasure content for a security event related to a security abnormality;

generate messages to be transmitted to and received from other electronic control devices;

transmit and receive the messages to and from the other electronic control devices; and verify the messages;

wherein, based on a verification result of the messages, the electronic control device determined whether to execute a security countermeasure based on the countermeasure content, wherein, the electronic control device further:

receives a pre-preparation message including detected content for occurrence of the security event and first countermeasure content for the security event from the other electronic control devices;

verifies the pre-preparation message based on consistency between second countermeasure content based on the detected content included in the pre-preparation message and the first countermeasure content included in the pre-preparation message;

generates a preparation message including third countermeasure content based on the first countermeasure content or the second countermeasure content when the verification of the pre-preparation message is successful;

transmits the preparation message to other electronic control devices and receives preparation messages transmitted from three or more of the other electronic control devices;

verifies the preparation message by determining whether the third countermeasure content included in each preparation message matches the first countermeasure content included in the pre-preparation message and determining whether the third countermeasure content matches the first countermeasure content for two or more of the received preparation messages;

generates a commitment message including the third countermeasure content when the verification of the preparation message is successful;

transmits the commitment message to the other electronic control devices and receives commitment messages transmitted from three or more of the other electronic control devices;

verifies the commitment message by determining whether the third countermeasure content included in each commitment message transmitted or received electronic device matches the first countermeasure content included in the pre-preparation message and determining whether the third countermeasure content matches the first countermeasure content for three or more received commitment messages; and when the verification of the commitment message is successful, a security countermeasure based on the third countermeasure content is executed.

8. The electronic control device according to claim 7, further comprising:

a detection electronic control unit (ECU) that is configured to detect the security event and configured to transmit a countermeasure request message including the detected content, wherein the electronic control device further:

receives the countermeasure request message generates the pre-preparation message with the countermeasure content based on the detected content included in the countermeasure request message; and transmits the pre-preparation message.

* * * * *